(12) United States Patent
Wang et al.

(10) Patent No.: US 11,789,493 B2
(45) Date of Patent: Oct. 17, 2023

(54) FOLDED SUPPORT, DISPLAY, KEYBOARD AND ELECTRICAL APPLIANCE

(71) Applicant: Feng Wang, Shenzhen (CN)

(72) Inventors: Feng Wang, Shenzhen (CN); Xizhe Wang, Shenzhen (CN)

(73) Assignee: Feng Wang, Shenzhen (CN)

( * ) Notice: Subject to any disclaimer, the term of this patent is extended or adjusted under 35 U.S.C. 154(b) by 0 days.

(21) Appl. No.: 17/161,577

(22) Filed: Jan. 28, 2021

(65) Prior Publication Data
US 2021/0157357 A1 May 27, 2021

Related U.S. Application Data

(63) Continuation of application No. PCT/CN2019/099144, filed on Aug. 2, 2019.

(30) Foreign Application Priority Data

Aug. 7, 2018 (CN) .......................... 201810887950.9

(51) Int. Cl.
*G06F 1/16* (2006.01)

(52) U.S. Cl.
CPC ............ *G06F 1/162* (2013.01); *G06F 1/1647* (2013.01); *G06F 1/1652* (2013.01); *G06F 1/1681* (2013.01)

(58) Field of Classification Search
CPC ...... G06F 1/162; G06F 1/1647; G06F 1/1652; G06F 1/1681; G06F 2200/1633; G06F 1/1641; G09F 9/301; F16C 11/04; F16M 11/00

See application file for complete search history.

(56) References Cited

U.S. PATENT DOCUMENTS

| | | | |
|---|---|---|---|
| 7,446,757 B2 | 11/2008 | Mochizuki et al. | |
| 9,470,404 B2 | 10/2016 | Lee et al. | |
| 9,910,458 B2* | 3/2018 | Watanabe | G06F 1/16 |
| 10,191,516 B2* | 1/2019 | Jang | H10K 50/844 |
| 10,620,668 B2* | 4/2020 | Park | G06F 1/1681 |
| 10,895,894 B2* | 1/2021 | Jan | G06F 1/1652 |
| 10,909,889 B2* | 2/2021 | Lee | G09F 9/301 |

(Continued)

FOREIGN PATENT DOCUMENTS

| | | |
|---|---|---|
| CN | 107170373 A | 9/2017 |
| CN | 206547121 U | 10/2017 |
| KR | 20150096946 A | 8/2015 |

*Primary Examiner* — Rockshana D Chowdhury
(74) *Attorney, Agent, or Firm* — MEI & MARK LLP; Manni Li

(57) ABSTRACT

Folded support, display, keyboard, and electrical appliance. Folded support comprises a limit structure and folds connected by rotating connection structure and are expandable and foldable. The limit structure ensures the front sides of the folds to be in a same plane in the expanding state of folded support; the rotating connection structure comprises a first and/or second rotating connection structures, the folds connected by the first rotate to get front sides close to each other, the folds connected by the second rotate to get rear sides close to each other; in folding state, a circle formed with the minimum bending radius of a flexible film is contained in the space from end sides of the folds connected by the first to the rotation axis, the end sides of folds connected by the second match up with a flexible film or have a gap to the flexible film.

20 Claims, 16 Drawing Sheets

(56) References Cited

U.S. PATENT DOCUMENTS

| | | | |
|---|---|---|---|
| 11,268,565 B2* | 3/2022 | Bae | F16C 11/04 |
| 2013/0021762 A1* | 1/2013 | van Dijk | H04M 1/022 |
| | | | 361/749 |
| 2013/0342090 A1* | 12/2013 | Ahn | G06F 1/1616 |
| | | | 312/258 |
| 2015/0330614 A1* | 11/2015 | Lee | B65D 85/38 |
| | | | 206/45.23 |
| 2021/0157357 A1* | 5/2021 | Wang | G06F 1/1652 |
| 2021/0304642 A1* | 9/2021 | Lee | G06F 1/1681 |

* cited by examiner

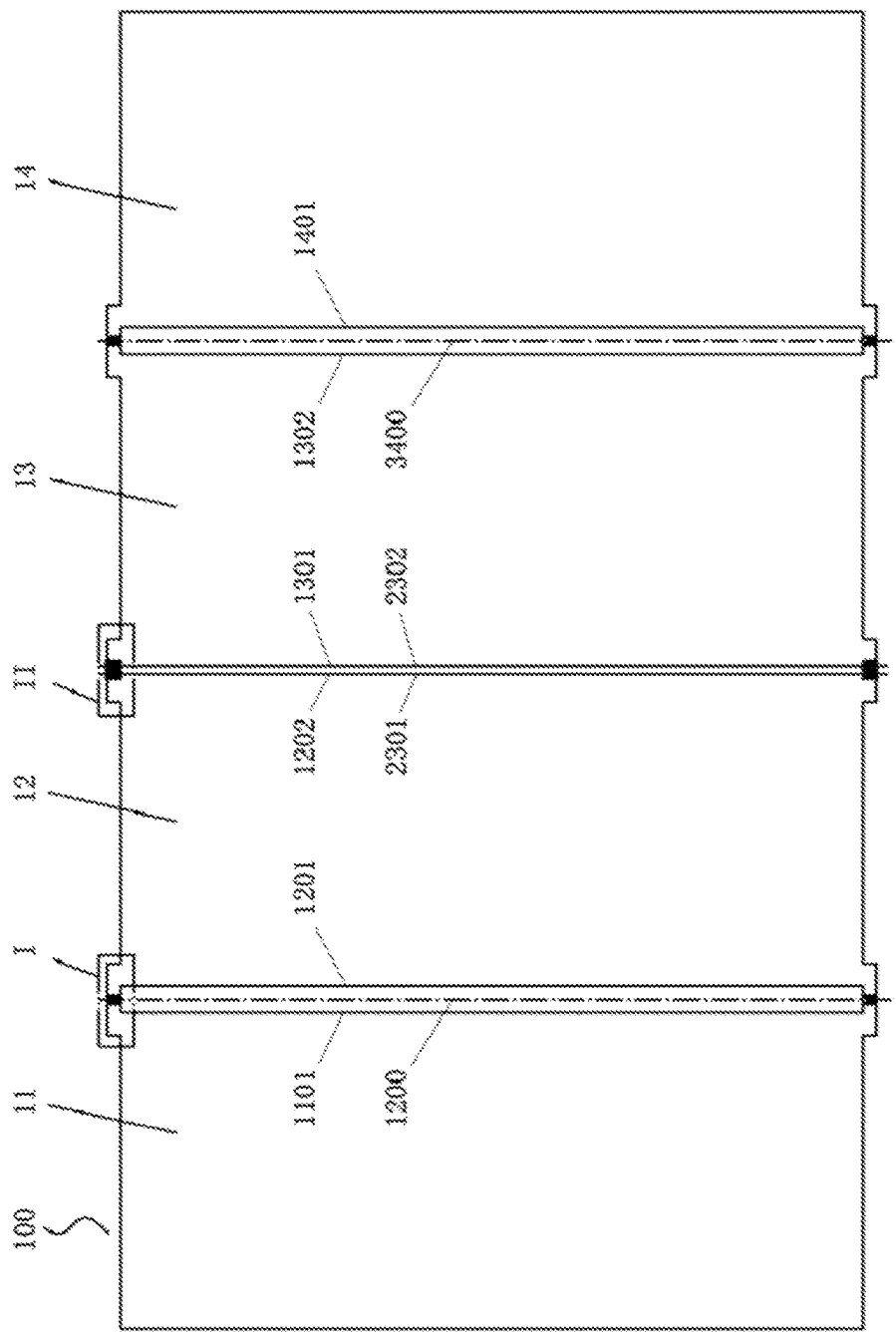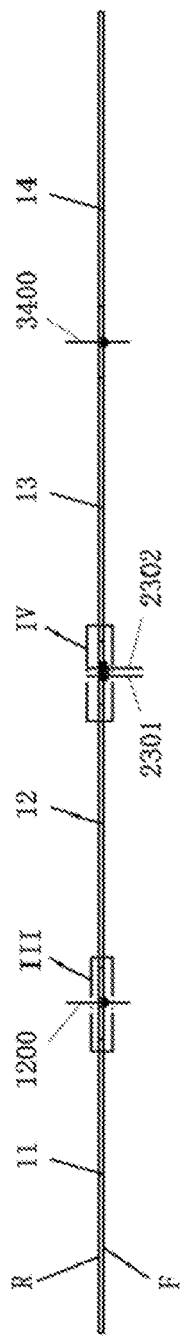
FIG. 1
FIG. 2

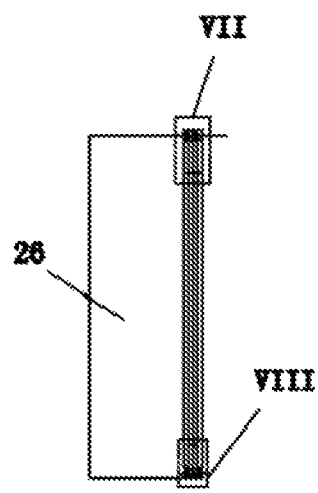
FIG. 28
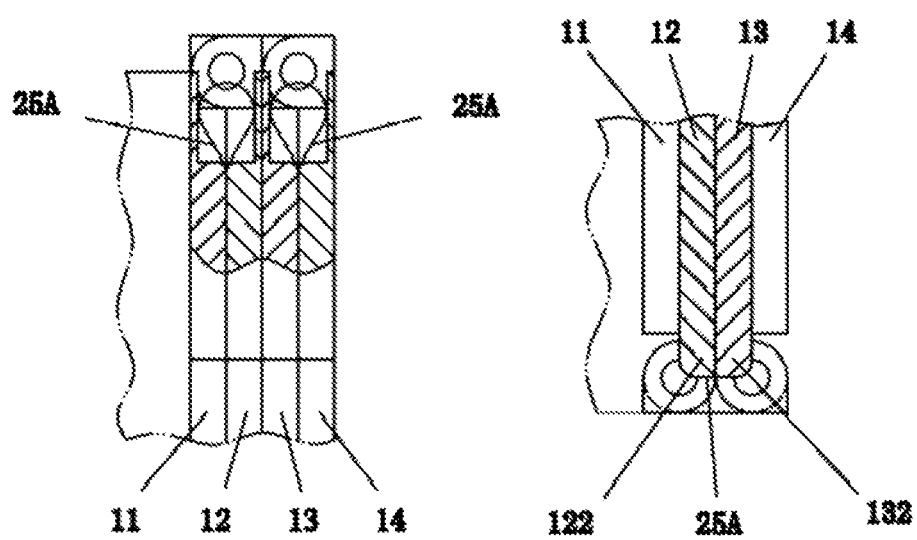
FIG. 29
FIG. 30

FOLDED SUPPORT, DISPLAY, KEYBOARD AND ELECTRICAL APPLIANCE

CROSS-REFERENCE TO RELATED APPLICATIONS

The subject application is a continuation of PCT/CN2019/099144 filed on Aug. 2, 2019, which claims priority on Chinese Application No. 201810887950.9 filed on Aug. 7, 2018 in China. The contents and subject matter of the PCT international application and Chinese priority application are incorporated herein by reference.

TECHNICAL FIELD

The present invention relates to a folded support for supporting a flexible structure, a display and a keyboard using the folded support, and an electrical appliance using the display and the keyboard.

BACKGROUND OF INVENTION

A folded support enables the expansion of its characteristic structure into the final folded state to realize reduction in size and easy storage. Currently, the structure of the folded support can be folded but is not suitable to support the folding of flexible structure such as flexible film, because in the folding process, the hinge structure of the folded support makes the folds to produce creases on the flexible structure supported by the folded support and damages the surface of flexible structure.

Current electrical displays, such as a liquid crystal display, an LED display, an OLED display, and an LCD display, etc., have fixed structural dimension with large horizontal and thickness size and cannot be folded. Therefore, all current electrical displays have disadvantages such as large size and inconvenience for storage and carry. Flexible film displays have been developed to overcome the disadvantages of the current electrical displays. The flexible film display is light, thin, soft, and can be arbitrarily bended, which facilitates storage in the non-use state and is easy to carry. However, how to make flexible displays reliably supported and fixed when in use and reliably folded when not in use remains unsolved problem.

Therefore, current electrical appliances with monitors, such as tablet computers, laptops, MP4 players, etc., are large in size and inconvenient to carry due to that the monitors cannot be folded. As for smart phone, as the monitor is non-foldable, the size of the display is limited to ensure that they are easy to carry, however, reading news and watching videos on the devices easily lead to visual fatigue.

SUMMARY OF INVENTION

The first technical problems to be solved by the present invention is to provide a folded support to overcome the disadvantages that the current folded support structure causes the supported flexible structure to produce creases and to damage the surface of the flexible structure.

The second technical problem to be solved by the present invention is to provide a display to overcome the disadvantages of the current displays as being non-foldable, large in size, and inconvenient to carry.

The third technical problem to be solved by the present invention is to provide a keyboard to overcome the disadvantages of the current keyboard being unable to fold, large size and inconvenient to carry.

The fourth technical problem to be solved by the present invention is to provide an electrical appliance to overcome the disadvantages of large size of the electrical appliance to carry inconveniently due to the failure of folding of the current electrical appliance display, and the disadvantage of making visual fatigue of the user due to the small size of the electrical appliance display.

The technical solution to solve the first technical problems of the present invention is to provide a folded support that comprises folds, the adjacent folds are connected with each other by a rotating connection structure to realize the rotation of the folded support from a final state of expansion to a final folded state, the folded support and its folds include a front side on one side of the folded support and a rear side on the other side of the folded support.

In the present invention, the folded support also comprises a limit structure, which ensures that the front side of the fold of the folded support is located in the same plane in the final state of expansion.

In the present invention, the rotating connection structure comprises a first rotating connection structure and a second rotating connection structure, alternatively, the rotating connection structure comprises the second rotating connection structure; the adjacent folds connected by the first rotating connection structure can rotate to get their front sides close to each other; the adjacent folds connected by the second rotating connection structure can rotate to get their rear sides close to each other.

In the present invention, the first rotating connection structure comprises a first upper connection structure and a first lower connection structure arranged respectively at the upper end and lower end of the erect end side of the fold, the first upper connection structure and the first lower connection structure are hinge structures; the rotation axes of the first upper connection structure and the first lower connection structure of the adjacent folds coincide with each other. The rotation axis of the first rotating connection structure is located on the plane of the front sides of the folds or is located in a region less than or equal to 2.5 mm before the plane of the front sides of the folds. The limit structure includes a first limit structure, which is arranged on the hinge structure of the first upper connection structure, the hinge structure of the first lower connection structure, or both; or the first limit structure comprises a limit part, which is arranged on the rear side of one of the two rotating connection folds and is located between the first upper connection structure and the first lower connection structure; when the folded support is in the final state of expansion, the limit part is in coordination with the structure of another page of the two rotating connection folds.

In the present invention, the second rotating connection structure comprises a second upper connection structure and a second lower connection structure respectively arranged at the upper end and lower end of the erect end side of the fold. The second upper connection structure comprises an upper adapting piece which is hinged respectively with the upper end of the erect end side of the two adjacent folds. The two upper hinge centers are located on the front side of the fold or before the front side of the fold or between the front side and the rear side of the fold, the center distance of the two upper hinge centers is longer than or equal to the sum of the distances from the two upper hinge centers to the rear side of the fold. The second lower connection structure comprises a lower adapting piece which is hinged respectively with the lower end of the erect end side of the two adjacent folds. The two lower hinge centers are located on the front side of the fold or before the front side of the fold or between the front side and the rear side of the fold, the center distance of the two lower hinge centers is longer than or equal to the sum of the distances from the two lower hinge centers to the rear side of the fold. The two adjacent folds realize the rotation from the final state of expansion to the final folded state through the second upper and lower connection structures. When the two upper hinge centers and the two lower hinge centers are located between the front side and the rear side of the fold, the rotational axis of each hinge is offset by a maximum distance of 2.5 mm from the front side to the rear side of the fold. The limit structure includes a second limit structure, it comprises a limit surface 2A1 which is set on one of the two adjacent folds and located on outside of the hinged upper end of erect side of the folds, a limit surface 2B1 which is set on the other one of the two adjacent folds and located on outside of the hinged upper end of erect side of the folds, a limit surface 2A2 which is set on one of the two adjacent folds and located on outside of the hinged lower end of erect side of the folds, and a limit surface 2B2 which is set on the other one of the two adjacent folds and located on outside of the hinged lower end of erect side of the folds. The limit surface 2A1 and 2B1 coordinate with each other when the folded support is in the final state of expansion and separate with each other when the folded support is in the final folded state. The limit surface 2A2 and 2B2 coordinate with each other when the folded support is in the final state of expansion and separate with each other when the folded support is in the final folded state.

In the present invention, when the number of folds is two pieces, the rotating connection structure of the folded support is the second rotating connection structure.

Alternatively, in the present invention, when the number of folds shall be at least three pieces, the adjacent rotating connection structure of the folded support alternately adopts the first rotating connection structure and the second rotating connection structure.

In the present invention, in the final folded state of the folded support, and on a cross section of the rotation axis which is located between the first upper connection structure and the first lower connection structure, the distance D1, from any separation points to the projection of the said rotation axis on the cross section, is longer than or equal to the product of the minimum bending radius of the flexible film and PI; the range D1 comprises a space containing a circle formed with the minimum bending radius of the flexible film; the separation points are the points in which the flexible film flatly attached onto the front side of the folded support separates from the erect edge of the front side of the fold.

In the present invention, on the cross section of any articulated rotation axis between the second upper connection structure and the second lower connection structure of the folded support, the flexible film, which is flat attached onto the front sides of the folds of the folded support, matches up with the erect end sides of the two adjacent folds or has a gap to the erect end sides of the two adjacent folds in the final folded state of the folded support.

In the folded support of the present invention, the hinge structure of the first upper connection structure and/or the first lower connection structure of the first rotating connection structure comprises two hinged arms with hinge holes and a pin shaft that is articulated in coordination with the hinge holes of the two hinged arms, or the hinge structure of the first upper connection structure and/or the first lower connection structure of the first rotating connection structure comprises an hinged arm with an articulated hole A and an hinged arm fixedly connected with a pin shaft A; the pin shaft A is hinged with the hinge hole A, the first limit structure comprises a limit surface 1A and a limit surface 1B which are arranged on the outer side of the two arms hinged each other, the limit surface 1A is located on one of the hinged arms and the limit surface 1B located on another one of the hinged arms; the limit surface 1A and 1B coordinate to limit each other when the folded support is in the final state of expansion and separate with each other when the folded support is in the final folded state; the second upper connection structure and/or the second lower connection structure of the second rotating connection structure include an circular arc surface C and an circular arc surface D which are arranged on the outer side of the hinge parts of the two folds hinged with the adapting piece; the circular arc surface C is connected with the rear side of one fold and one of the limit surfaces of the said second limit structure, the circular arc surface D is connected with the rear side of another fold and another one of the limit surfaces of the said second limit structure; the circular arc surface C and the circular arc surface D contact and cooperate with each other when the folding frame is in the final state of expansion and in the folding process.

In the folded support of the present invention, the fold which is connected by the first rotating connection structure comprises a guard edge arranged on the rear side of the fold; the guard edge is located between the first upper connection structure and the first lower connection structure and extends out from the rear side of the fold, the erect end face of the guard edge closes to the plane Z which contains the rotation axis of the first rotating connection structure and is perpendicular to the rear side of the fold; the guard edge is bounded by the plane Z. In the final folded state of the folded support, the space between the inner side of the guard edges and the erect end sides of the two adjacent folds is a space containing a circle formed by the minimum bending radius of the flexible film.

In the folded support of the present invention, the folded support comprises a folded positioning structure and/or a first expanded positioning structure and second expanded positioning structure; the folded positioning structure comprises a component E and a component F which can be magnetically absorbed with each other, the component E and the component F are respectively set on two adjacent folds. When the folded support is in the final folded state, the component E and the component F overlap at least partially and attract each other; the first expanded positioning structure comprises a positioning component 1a which is set a limit surface 1A of the said first limit structure and a positioning component 1b which is set a limit surface 1B of the said first limit structure, the positioning component 1a and the positioning component 1b can be magnetically attracted each other and at least partially overlapped to attracts when the folded support is in the final state of expansion; the second expanded positioning structure comprises a positioning component 2a1 which is set a limit surface 2A1 of the said second limit structure, a positioning component 2b1 which is set a limit surface 2B1 of the said second limit structure, and/or a positioning component 2a2 which is set a limit surface 2A2 of the said second limit structure, a positioning component 2b2 which is set a limit surface 2B2 of the said second limit structure; the positioning component 2a1 and the positioning component 2b1 can be magnetically attracted each other and at least partially overlapped to attracts when the folded support is in the final state of expansion, the positioning component 2a2 and the positioning component 2b2 can be magnetically attracted each other and at least partially overlapped to attracts when the folded support is in the final state of expansion.

In the folded support of the present invention, the folded support comprises a support part which is foldable and connected on the rear side of the fold; in the final folded state of the folded support, the support part is folded onto the rear side of the fold; in the final expanded state of the folded support, the support part is expanded and to cooperate with the lower side of the folded support to support the folded support to be in an inclined posture.

In the folded support of the present invention, the upper end face of the fold is flush with the upper end face of the first upper connection structure and/or the upper end face of the second upper connection structure, the lower end face of the fold is flush with the lower end face of the first lower connection structure and/or the lower end face of the second lower connection structure; or the upper end face of the fold is flush with the upper end face of the first upper connection structure and/or the upper end face of the second upper connection structure, the lower end face of the fold is flush with the upper end face of the first lower connection structure and/or the upper end face of the second lower connection structure; or the upper end face of the fold is flush with the lower end face of the first upper connection structure and/or the lower end face of the second upper connection structure, the lower end face of the fold is flush with the lower end face of the first lower connection structure and/or the lower end face of the second lower connection structure; or the upper end face of the fold is flush with the lower end face of the first upper connection structure and/or the lower end face of the second upper connection structure, the lower end face of the fold is flush with the upper end face of the first lower connection structure and/or the upper end face of the second lower connection structure. The above "and/or" structure is that it is the relation of "and" when the number of folds is at least three pieces, and it is the relation of "or" when the number of folds is two pieces.

The technical solution to solve the second technical problems of the present invention is to construct a display, its characteristic is that the display comprises a folded support and a flexible display; the flexible display is attached to the front side of the folded support or to the front side of the folded support and the rear side of one of the end folds of the folded support; the folded support is the one mentioned above.

In the folded support, the upper end face of the fold is flush with the upper end face of the first upper connection structure and/or the upper end face of the second upper connection structure; the lower end face of the fold is flush with the lower end face of the first lower connection structure and/or the lower end face of the second lower connection structure. The flexible display is attached to the front side of the folded support and is in a continuous flat state when the folded support is in the final state of expansion. The upper edge of the flexible display is flush with the lower end face of the first upper connection structure and/or the lower end face of the second upper connection structure, the lower edge of the flexible display is flush with the upper end face of the first lower connection structure and/or the upper end face of the second lower connection structure. Or the upper edge of the flexible display is flush with the upper end face of the fold, and the lower edge of the flexible display is flush with the lower end face of the fold. The flexible display is arranged gaps in positions corresponding to the first upper connection structure, the second upper connection structure, the first lower connection structure and the second lower connection structure to avoid the hinges of the connection structures. Or the upper edge of the flexible display is flush with the lower end face of the first upper connection structure and/or the lower end face of the second upper connection structure, the lower edge of the flexible display is flush with the lower end face of the first lower connection structure and/or the lower end face of the second lower connection structure. The flexible display is arranged gaps in positions corresponding to the first lower connection structure and the second lower connection structure to avoid the hinges of the connection structures. Or the upper edge of the flexible display is flush with the upper end face of the first upper connection structure and/or the upper end face of the second upper connection structure, the lower edge of the flexible display is flush with the upper end face of the first lower connection structure and/or the upper end face of the second lower connection structure. The flexible display is arranged gaps in positions corresponding to the first upper connection structure and the second upper connection structure to avoid the hinges of the connection structures.

Alternatively, in the folded support, the upper end face of the fold is flush with the lower end face of the first upper connection structure and/or the lower end face of the second upper connection structure, and the lower end face of the fold is flush with the upper end face of the first lower connection structure and/or the upper end face of the second lower connection structure. The flexible display is attached to the front sides of the folds between the upper end face and the lower end face of the folds and is in a continuous flat state when the folded support is in the final state of expansion.

Alternatively in the folded support, the upper end face of the fold is flush with the upper end face of the first upper connection structure and/or the upper end face of the second upper connection structure, and the lower end face of the fold is flush with the upper end face of the first lower connection structure and/or the upper end face of the second lower connection structure; the flexible display is attached to the front side of the folded support and is in a continuous flat state when the folded support is in the final state of expansion. The upper edge of the flexible display is flush with the upper end face of the first upper connection structure and/or the upper end face of the second upper connection structure, and the lower edge of the flexible display is flush with the upper end face of the first lower connection structure and/or the upper end face of the second lower connection structure; the flexible display is arranged the gaps at the positions corresponding to the first upper connection structure and the second upper connection structure to avoid the hinges of the connection structures. Or the upper edge of the flexible display is flush with the lower end face of the first upper connection structure or the lower end face of the second upper connection structure, and the lower edge of the flexible display is flush with the upper end face of the first lower connection structure and/or the upper end face of the second lower connection structure.

Alternatively in the folded support, the upper end face of the fold is flush with the lower end face of the first upper connection structure and/or the lower end face of the second upper connection structure, and the lower end face of the fold is flush with the lower end face of the first lower connection structure and/or the lower end face of the second lower connection structure; the flexible display is attached to the front side of the folded support and is in a continuous flat state when the folded support is in the final state of expansion. The upper edge of the flexible display is flush with the lower end face of the first upper connection structure and/or the lower end face of the second upper connection structure, and the lower edge of the flexible display is flush with the upper end face of the first lower connection structure and/or the upper end face of the second lower connection structure. Or the upper edge of the flexible display is flush with the lower end face of the first upper connection structure and/or the lower end face of the second upper connection structure, and the lower edge of the flexible display is flush with the lower end face of the first lower connection structure and/or the lower end face of the second lower connection structure. The flexible display is arranged the gaps at the positions corresponding to the first lower connection structure and the second lower connection structure to avoid the hinges of the connection structures.

The above "and/or" structure, when the folds of the folded support are at least three folds, it is the relationship of "and"; when the folds of the folded support are two folds, it is the relationship of "or."

The technical solution to solve the third technical problems of the present invention is to construct a keyboard, its characteristic is that the keyboard comprises a folded support, a flexible sensing film and a mapping keyboard. The flexible sensing film is attached to the front side of the folded support, the mapping keyboard is arranged on the flexible sensing film, and the folded support is the one mentioned above.

The technical solution to solve the fourth technical problems of the present invention is to construct an electrical appliance, its characteristic is that the electrical appliance comprises a circuit module to realize the function of the electrical appliance, a power supply module to supply the electrical appliance, and a display module to process information. The power supply module is electrically connected with the circuit module and the display module for power supply. The display module is connected with the circuit module to output the processing information of the circuit module, characterized in that the display module adopts the above display.

In the present invention, the power supply module is fixed or rotatably connected to the rear side of the fold of the folded support.

In the present invention, the circuit module is fixed on the rear side of one of the folds or a combination of the folds of the folded support.

Alternatively, the circuit module is rotatably connected with the end fold of the folded support. In the folded state, the circuit module is folded to the rear side of the end fold connected with itself.

Alternatively, the circuit module is rotatably connected with the upper side or lower side of the middle fold of the folded support. In the folded state, the circuit module is folded to the rear side of the middle fold connected with itself.

In the electrical appliance of the present invention, the electrical appliance Comprises a keyboard. The keyboard is the one described above.

In the present invention, the flexible sensing film of the keyboard is electrically connected with the circuit module.

Compared with the current technology, the folded support, display and electrical appliance of the present invention have the beneficial effects of:

1. To adopt the special structure design of the folded support to realize the reliable support and folding of the flexible display, the folded support can be folded without damage to the flexible display. The dimension of a 16:9 widescreen flexible display can be greatly reduced by multi-layer folding of the folded support.

2. To realize reliable expansion and folding of the flexible display. In the final state of the folded support expansion, the flexible display is guaranteed to be in a continuous flat state, and in the final folded state, the flexible display surface is guaranteed to be folded reliably. After folding, the display is reduced much in horizontal size and easy carried and collected.

3. To make a keyboard foldable and to provide a condition for a laptop to be folded.

4. The electrical appliance of the present invention, such as smart phones, tablet computers, laptops, MP4 players and so on, can be reduced much in horizontal dimension by adopting the display of the present invention, and can be reduced much in overall size by a flexible design of the circuit module and the power supply module. It can realize a large screen and small volume electrical appliance.

5. The flexible display is low in power consumption; it can reduce much the capacity requirement for a power supply module. By adopting integrated circuit to realize miniaturization of circuit modules, adopting solar cells to collect solar energy and adopting graphene batteries to store electric energy, on one hand it can reduce the sizes of circuit modules and power supply modules, on the other hand it can provide favorable conditions for using graphene technology to realize non-charging large-screen electrical appliances.

6. It is simple in structure and easy to implement.

BRIEF DESCRIPTION OF THE FIGURES

FIG. 1 shows the front view of an embodiment of the folded support of the present invention in the final state of expansion.

FIG. 2 shows the top view of the embodiment of the folded support of the present invention in FIG. 1 in the final expanded state.

FIG. 28 shows the top view of an embodiment in the final folded state of the present invention of FIG. 26.

FIG. 29 shows the enlarged part section view of Part VII in FIG. 28.

FIG. 30 shows the enlarged part section view of Part VIII in FIG. 28.

DESCRIPTION

The present invention is further illustrated in conjunction with the appended figures and embodiments as below.

The present invention provides a folded support, display, keyboard and electrical appliance. The folded support comprises folds and limit structure, the folds are connected by a rotating connection structure and can be expanded and folded, the folded support and the folds have a front side and a rear side, the limit structure ensures that the front sides of the folds to be in a same plane in the expanded state of the folded support; the rotating connection structure includes a first rotating connection structure and/or a second rotating connection structure, the folds connected by the first rotating connection structure rotate to get their front sides close to each other, the folds connected by the second rotating connection structure rotate to get their rear sides close to each other; in the folding state, a circle formed with the minimum bending radius of a flexible film can be contained in the space from the end sides of the folds connected by the first rotating connection structure to the rotation axis, the end sides of the folds connected by the second rotating connection structure match up with a flexible film or have a gap to the flexible film; the display comprises the folded support as above and a flexible display attached onto the folded support; the electrical appliance comprises a circuit module, a power supply module and a display module as above, the power supply module is electrically connected with the circuit module and the display module, the display module is electrically connected with the circuit module. The present invention makes a display and an electrical appliance to be folded and easy to carry.

As shown in FIGS. 1 and 2, the folded support 100 of the present invention comprises folds 11, 12, 13, 14, rotating connection structure, and limit structure.

Figures 16, 17:
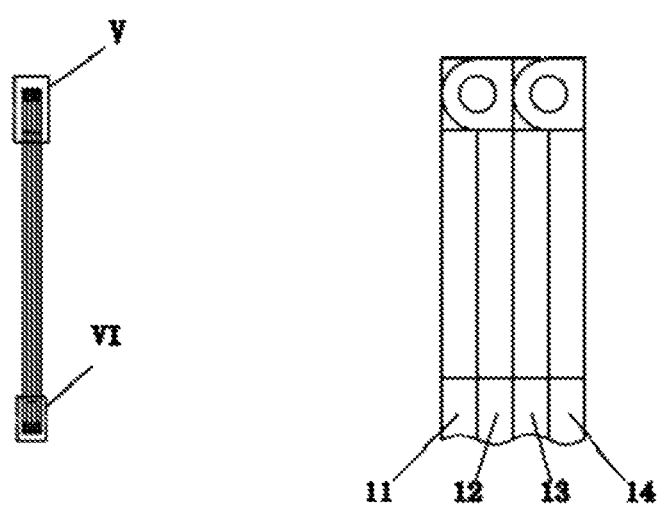
FIG. 16 shows the top view of an embodiment in a final folded state of the folded support in FIG. 1 of the present invention.
FIG. 17 shows the enlarged view of Part V in FIG. 16.

The adjacent folds 11 and 12, 12 and 13, 13 and 14 are connected by the rotating connection structure to realize the folded support from the final state of expansion as shown in FIGS. 1 and 2 to the final folded state as shown in FIG. 16.

As shown in FIG. 2, the folded support 100 and its folds 11, 12, 13 and 14 include a front side F on one side of the folded support and a rear side R on the other side of the folded support.

The limit structure ensures that the front side F of the folds 11, 12, 13 and 14 of the folded support 100 is located on the same plane in the final state of expansion, so as to ensure that the surface of the display to show an image to be real and not deformed when using the folded support to construct the display.

The rotating connection structure comprises a first rotating connection structure and a second rotating connection structure.

Figure 3:
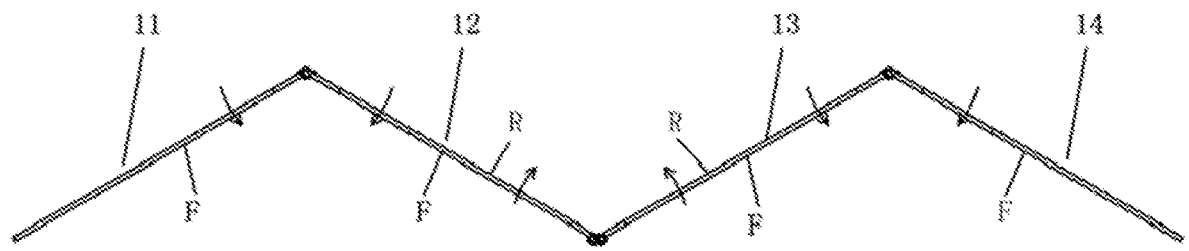
FIG. 3 shows the top view of the embodiment of the folded support of the present invention in FIG. 1 in the folded intermediate state.
Figure 4:
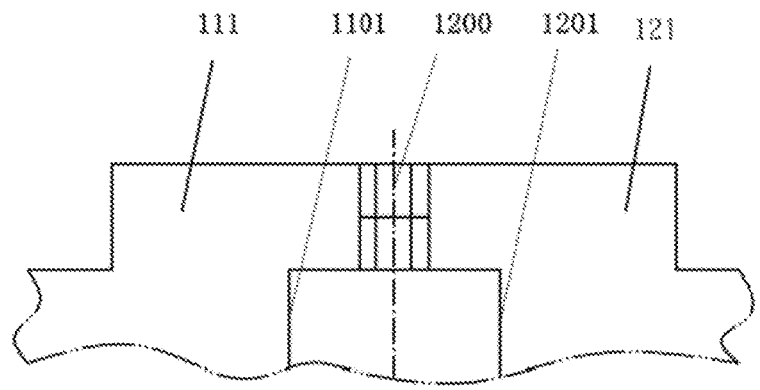
FIG. 4 shows the enlarged view of part I in FIG. 1.
Figure 5:
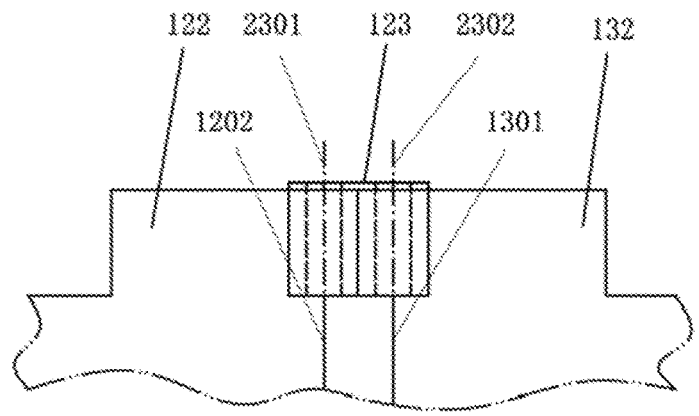
FIG. 5 shows the enlarged view of part II in FIG. 1.

As shown in FIG. 3, the adjacent folds 11 and 12, 13 and 14, which are connected by the first rotating connection structure, turn to each other to make their front side F to be adjacent at the edges 1101 and 1201 as well as 1302 and 1401; the adjacent folds 12 and 13, which are connected by the second rotating connection structure, turn to each other to make their rear side R to be adjacent at the edges 1202 and 1301.

As shown in FIGS. 1-2, 4, and 6, the first rotating connection structure comprises a first upper connection structure set on the upper end 111, 121 of the erect end side of the fold and a first lower connection structure set on the lower end of the erect end side of the fold. The axes (1200 and 3400 as shown in FIG. 1) of the first upper connection structure and the first lower connection structure of the adjacent folds are coincided to ensure that the adjacent folds 11 and 12, 13 and 14 rotate freely and without interference. The first upper connection structure and the first lower connection structure are hinge structures. The erect end side of the folds is the left side and right side of the folds in the up-right direction as shown in FIG. 1. The upper ends of the erect end side of fold 11 and fold 12 in FIG. 1 are part 111 and 121 in FIG. 6.

Figure 6:
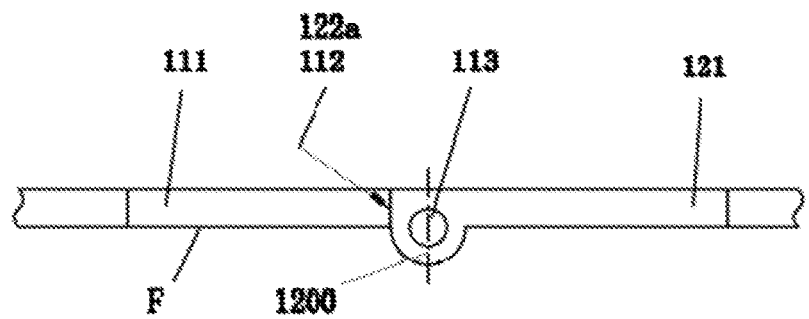
FIG. 6 shows the enlarged view of part III in FIG. 2.

As shown in FIG. 6, in this embodiment, the rotating axis of pin 113 of the first rotating connection structure is located on the plane of the front side F of the fold. The flexible film 25 (the same below), which is attached onto the fold of the folded support at a final expanded state in a flat state, passes through the rotation center of the folds. Therefore, the folding rotation of the folds has not any impact for the length of the flexible film 25.

Figure 18:
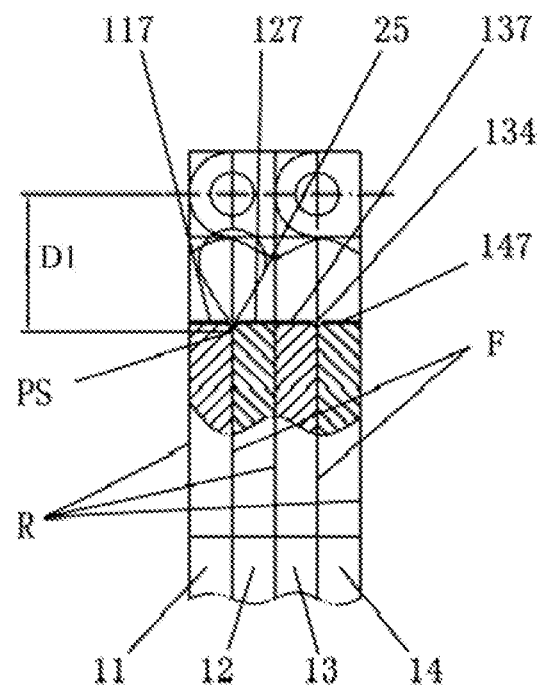
FIG. 18 shows the enlarged part section view of Part V in FIG. 16.
Figure 19:
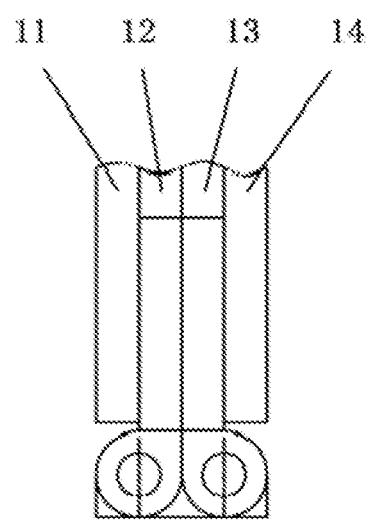
FIG. 19 shows the enlarged view of Part VI in FIG. 16.
Figure 20:
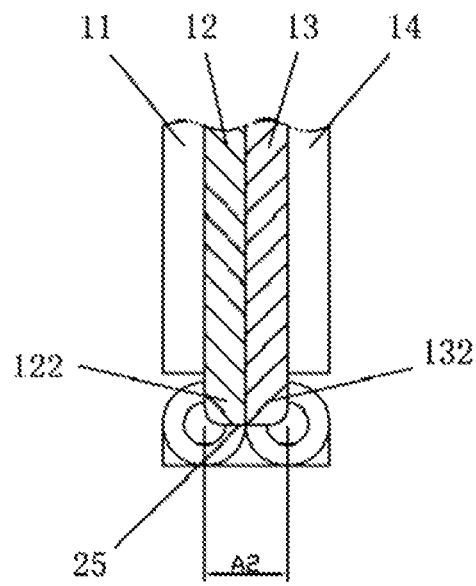
FIG. 20 shows the enlarged part section view of Part VI in FIG. 16.

As shown in FIGS. 16-18, in the final folded state of the folded support 100, along the cross section of the axis of the first rotating connection structure and between the first upper connection structure and the first lower connection structure of the folded support 100, the distance D1 between any separation point PS, which is the release point between the flexible film 25 and the front side edge of the adjacent fold 11 and fold 12, and the projection of the rotation axis onto the cross section is greater than or equal to the product of the minimum bending radius of the flexible film 25 and the ratio of the circumference of a circle to its diameter π. The range of D1 constitutes a space containing a circle formed with the minimum bending radius of the flexible film so as to ensure the surface of the flexible film, which is attached onto the folded support, to be well and without any indentation in folding process.

As shown in FIG. 18, without guard edges on the adjacent folds, the space to contain a circle of the radius of the flexible film 25 is formed by the erect end side of the folds 117 and 127 and the plane which passes though the rear side of folds 11 and 12.

To avoid the junction of the front side of the fold and the erect end side of the fold to damage the flexible membrane 25 attached to the front side of the folded support, a rounded corner 134 is set at the junction of the front side of the fold and the erect end side of the fold. The erect end side of the fold is surface 117, 127, 137, 147 of fold 11, 12, 13, 14 as shown in FIG. 18.

Figure 8:
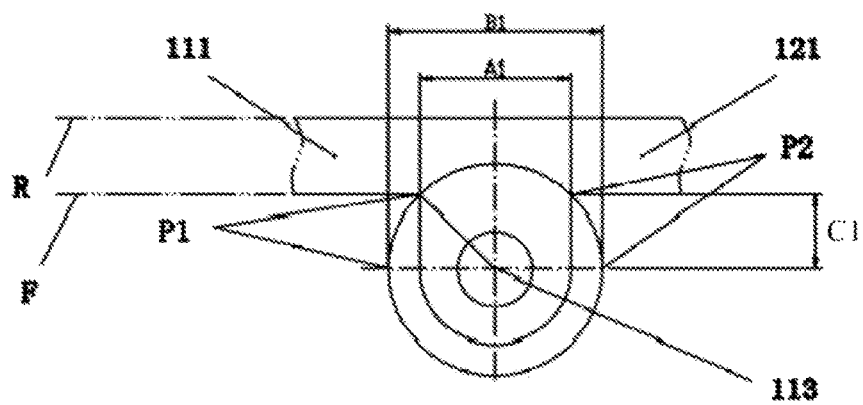
FIG. 8 is a schematic diagram showing that the rotation axis of first rotating connection structure offsets forward away from the front side of the folded support, the distance between adjacent points P1 and P2 on the front side of adjacent folds is increasing in the folding process.

As shown in FIG. 8, in another embodiment, the axis of pin 113 of first rotating connection structure is located in the area before the plane of the front side F of the fold.

The data are listed in table 1 as follows: when the axis of pin 113 is offset distance C1 away from the front side F, the distance between the adjacent points P1 and P2 of the two adjacent folds at the final expanded state of the folded support 100 is A1, during the folded support 100 being folded to its final folded state, the elongation of the flexible film 25 at the maximum distance B1 of P1P2 is B1-A1 (as shown in FIG. 8), wherein $$B1 - A1 = \sqrt{A1^2 + 4C1^2} - A1,$$

and A1=2×D1.

TABLE 1 the relationship of C1, A1 and B1-A1 (unit: mm)

| offset distance C1 | A1 | B1-A1 | A1 | B1-A1 | A1 | B1-A1 |
|---|---|---|---|---|---|---|
| 0.5 | 6 | 0.083 | 7 | 0.071 | 8 | 0.062 |
| 1.0 | 6 | 0.325 | 7 | 0.280 | 8 | 0.246 |
| 1.5 | 6 | 0.708 | 7 | 0.616 | 8 | 0.544 |
| 2.0 | 6 | 1.211 | 7 | 1.062 | 8 | 0.944 |
| 2.5 | 6 | 1.810 | 7 | 1.602 | 8 | 1.434 |
| 3.0 | 6 | 2.485 | 7 | 2.220 | 8 | 2 |
| 3.5 | 6 | 3.220 | 7 | 2.899 | 8 | 2.630 |
| 4.0 | 6 | 4 | 7 | 3.630 | 8 | 3.314 |

It can be seen from the above table that the smaller the offset distance C1 is, the smaller the elongation of the flexible film 25 is in folding.

Referring to the Poisson's ratio of HDPE, V=−Ex/Ey=0.38, wherein Ex is the transverse deformation of the material under stress, and Ey is the longitudinal deformation.

When Ex=B1−A1=1.434 mm, Ey=−Ex/V=−1.434/0.38=−3.773 mm.

When the axis of pin 113 of the first rotating connection structure is offset before the plane of the front side F of the fold, the following problems occurs in the folding process of the folded support: (1) The flexible film is lengthened longitudinally and is shortened transversely; (2) In the repeated folding process of the folded support for a long time, the flexible film is easy to lead to fatigue elongation for repeated stretch, and easy to separate from the folded support. Nevertheless, within the elastic deformation range of the flexible film, the purpose of the present invention can still be realized when the axis of the pin of the first rotating connection structure is offset before the plane of the front side F of the fold.

Generally, the purpose of the present invention can be realized when the axis of pin 113 is located in an area which is less than or equal to 2.5 mm before the plane of the front side F of the fold. One may also choose that the axis of pin 113 is located in the area which is less than or equal to 2 mm, 1.5 mm or 1 mm before the front side F of the fold.

The hinge structure of the first rotating connection structure may be adopted including but not limited to the structures as follows:

1. The hinge structure, on the first upper connection structure and the first lower connection structure of the first rotating connection structure, comprises two hinged arms, each of which has a hinged hole, and a pin hinged with the hinged holes of the two hinged arms. Or the hinge structure, on the first upper connection structure or the first lower connection structure of the first rotating connection structure, comprises two hinged arms, each of which respectively has a hinged hole, and a pin hinged with the hinged holes of the two hinged arms.

2. The hinge structure, on the first upper connection structure and the first lower connection structure of the first rotating connection structure, respectively comprises a hinged arm with a hinged hole A and a hinged arm fixedly connected to a pin A, the pin A is hinged with the hinge hole A. Or the hinge structure, on the first upper connection structure or the first lower connection structure of the first rotating connection structure, comprises a hinged arm with a hinged hole A and a hinged arm fixedly connected to a pin A, the pin A is hinged with the hinged hole A.

Figure 10:
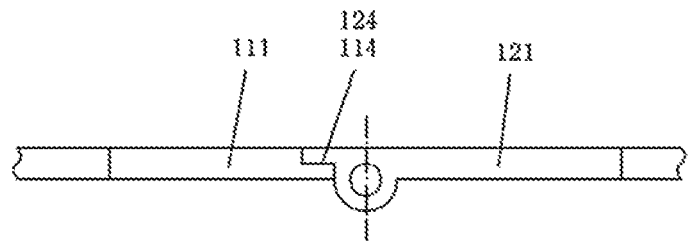
FIG. 10 shows the enlarged view of part III in FIG. 2 and another embodiment of the folded support of the present invention.
Figure 12:
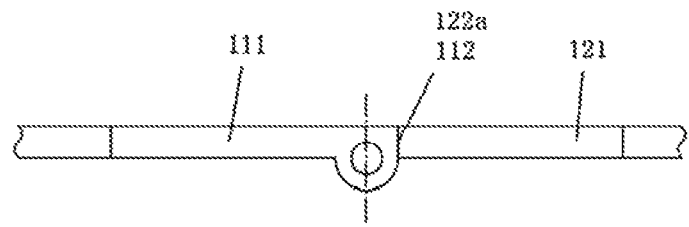
FIG. 12 shows the enlarged view of part III in FIG. 2 and another embodiment of the folded support of the present invention.

The limit structure adopts the first limit structure corresponding to the first rotating connection structure. The first limit structure can be used including but not limited to the structures as follows:

1. As shown in FIGS. 6 and 10, the first limit structure is arranged on the hinge structure of the first upper connection structure, or the first limit structure is arranged on the hinge structure of the first lower connection structure, or the first limit structures are simultaneously arranged on both the hinge structures of the first upper connection structure and the hinge structure of the first lower connection structure, all of them can realize the purpose of ensuring that the front sides of the folds are located on the same plane when the folded support 100 is in the final state of expansion. More precisely, the first limit structure comprises a limit surface 1A-112 and a limit surface 1B-122a which are arranged on the out parts of the interoperable two hinged arms (which are located on the upper ends of the erect end side 111 and 121 of the folds and the lower ends of the erect end side of the folds). The limit surface 1A-112 and the limit surface 1B-122a match each other when the folds of the folded support 100 are in the final state of expansion and separate from each other when the folded support 100 is in the final folded state. As shown in FIG. 6, the limit surfaces 1A-112 and 1B-122a are provided transversely along the front side of the fold. The processing accuracy of the limit surfaces 1A-112 and 1B-122a is required to ensure that the front sides of the folds are on the same plane when the folded support 100 is in the final state of expansion. As shown in FIG. 10, it is easier to ensure that the front sides of the folds are on the same plane when the folded support 100 is in the final state of expansion that the limit surfaces 1A-114 and 1B-124 are provided along the parallel direction of the front sides of the folds or along an inclined direction of a small angle of the front sides of the folds (for example, the inclined angle is less than 10 degrees). As shown in FIGS. 6 and 10, the limit surface is arranged on the left side of the hinge structure. In other embodiments as shown in FIG. 12, the limit surface can be set on the right side of the hinge structure.

2. In another embodiments, the first limit structure comprises a limit part, the limit part is arranged on the back side of one of the two folds which are rotatably connected each other, and the limit part is located between the first upper connection structure and the first lower connection structure. When the folded support 100 is in the final state of expansion, the limit part is matched with the structure of the other one fold to make the two rotatably connected folds to be restricted from rotation.

As shown in FIGS. 1-2, 5, and 7, the second rotating connection structure comprises a second upper connection structure and a second lower connection structure respectively arranged on the upper end and the lower end of the erect end side of the fold. The second upper connection structure comprises an upper adapting piece 123. The upper adapting piece 123 is respectively hinged with the upper ends 122 and 132 of the erect end side of the two adjacent folds 12 and 13 at respective edges 1202 and 1301 with respective axes 2301 and 2302. The two upper hinge centers are located on the front side of the fold. The center distance A2 of the two upper hinge centers is greater than or equal to the sum of the distances from the two hinge centers to the rear side of the fold. As well, the second lower connection structure comprises a lower adapting piece. The lower adapting piece is respectively hinged with the lower end of the erect end side of the two adjacent folds 12 and 13. The two lower hinge centers are located on the front side of the fold. The center distance of the two lower hinge centers is greater than or equal to the sum of the distances from the two hinge centers to the rear side of the fold. Through the second upper connection structure and the second lower connection structure, the two adjacent folds realize the rotation from the final state of expansion to the final folded state.

In other embodiments, when the two upper hinge centers are located before the front side of the fold or between the front side of the fold and the rear side of the fold, it needs to meet that the center distance between the two upper hinge centers is greater than or equal to the sum of the distances between the two hinge centers and the rear side of the fold, so as to avoid the interference of the two folds in the folding. Additionally, when the two lower hinge centers are located before the front side of the fold or between the front side of the fold and the rear side of the fold, it needs to meet that the center distance between the two lower hinge centers is greater than or equal to the sum of the distances between the two lower hinge centers and the rear side of the fold.

In other embodiments, when the two upper hinge centers are located on or before the rear side of the fold, it is not necessary to satisfy the condition that the distance between the two upper hinge centers is greater than or equal to the sum of the distance between the two hinge centers and the rear side of the fold. The same is true for the two lower hinge centers.

Figure 7:
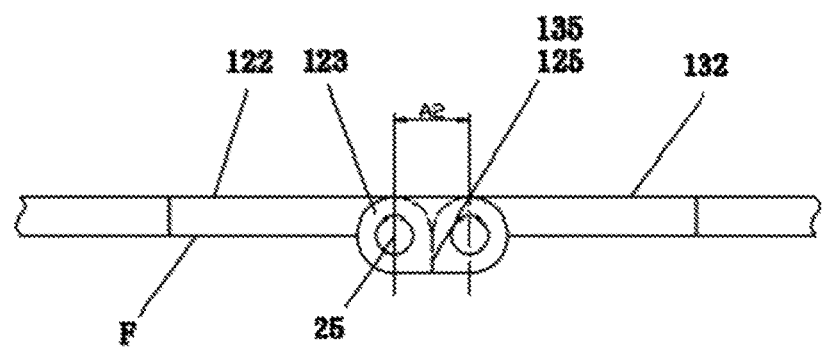
FIG. 7 shows the enlarged view of part IV in FIG. 2.
Figure 9:
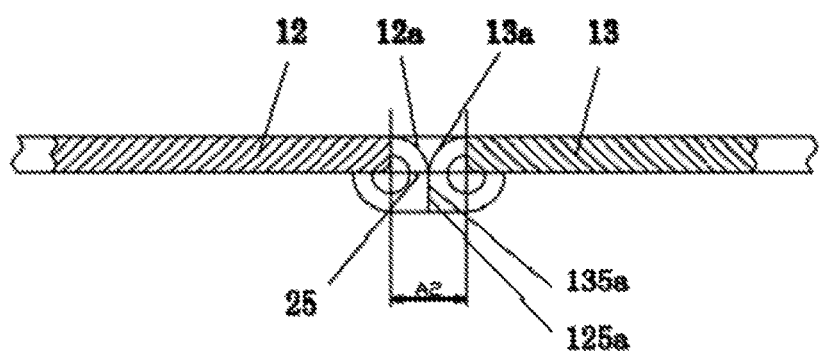
FIG. 9 shows the enlarged section view of part IV in FIG. 2, where the section plane is along the cross section of the two axes of the rotating connection structure and located between the upper connection structures 2 and the lower connection structures 2 of the fold.

In the embodiment as shown in FIGS. 7 and 9, the hinge axes are located on the front side F of the fold and the flexible film 25 passes through the rotation center of the fold, at this point, the folding rotation of the fold does not have any effect on the length of the flexible film 25. As shown in FIGS. 9, 16, 19, and 20, in the final folded state of the folded support and on the cross section of any hinge axes between the second upper connection structure and the second lower connection structure of the folded support, the flexible film 25 is corresponding with the erect end sides of the adjacent two folds 12, 13 in folding state, or it can have a gap between the flexible film 25 and the erect end sides of the adjacent two folds 12, 13 in folding state.

Figure 13:
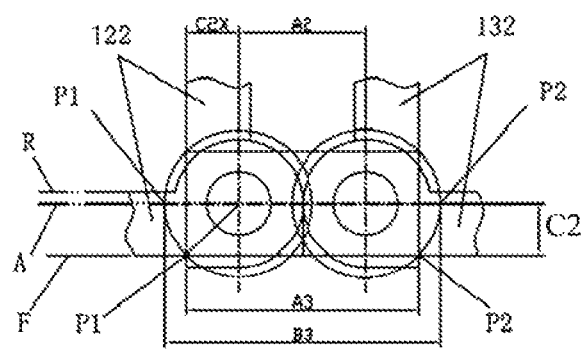
FIG. 13 is a schematic diagram showing that the rotation axis of the second rotating connection structure is located on the plane A which offsets backward away from the front side of the folded support, the distance between adjacent points P1 and P2 on the front side of adjacent folds is varying in the folding process (In order to clearly show the expansion and collapse states, the adapting piece is not shown).

In other embodiments as shown in FIG. 13, the hinge axes of the second connection structure are located on the plane A that is offset a distance C2 from the front side F of the fold to the rear side R of the fold.

The data are listed in Table 2 as follows: when the hinge axes are offset a distance C2 from the front side F of the fold to the rear side R of the fold, the distance between the adjacent points P1 and P2 of the two adjacent folds is the distance A3 in the final expansion state of the folded support 100. During the process of the folded support 100 to rotate to its final folded state, the elongation of the flexible film 25 is B3-A3 at the maximum distance B3 of P1P2 (as shown in FIG. 13). Wherein, A3=A2+2C2X, generally A3 takes 4 mm, 5 mm or 6 mm etc., $$B3 - A3 = 2C2\sqrt{1+x^2} - X,$$

X is a coefficient.

TABLE 2

The relationship of C2, X, and B3-A3 (unit: mm).

| offset distance C2 | X | B3-A3 | X | B3-A3 | X | B3-A3 |
|---|---|---|---|---|---|---|
| 0.5 | 1 | 0.414 | 1.5 | 0.303 | 2 | 0.236 |
| 1.0 | 1 | 0.828 | 1.5 | 0.606 | 2 | 0.472 |
| 1.5 | 1 | 1.243 | 1.5 | 0.908 | 2 | 0.708 |
| 2.0 | 1 | 1.656 | 1.5 | 1.212 | 2 | 0.944 |
| 2.5 | 1 | 2.07 | 1.5 | 1.515 | 2 | 1.18 |

It can be seen from the above table that the smaller the offset distance C2 is, the smaller the elongation of flexible film 25 is in folding.

Refer to the Poisson's ratio HDPE V=−Ex/Ey=0.38, when Ex=1.18 mm, Ey=−Ex/Ey=−1.18/0.38=−3.105 mm.

When the hinge axes of the second rotating connection structure are located on the plane A that offsets from the plane of the front side F of the fold, and in the folding process of the folded support, the following problems occur: (1) the flexible film is lengthened longitudinally and is shortened transversely; (2) in a repeated folding process of the folded support for a long time, the flexible film is pulled repeatedly that is easy to lead the flexible film to be fatigued and elongated, and easy to lead the flexible film to separate from the folded support. Despite of the problems, within the elastic deformation range of the flexible film, the purpose of the present invention can still be realized when the axes of the pins of the second rotating connection structure are located in the offset region from the front side F to the rear side R of the fold. In general, it can realize the purpose of the present invention when the axes of the pins of the second rotating connection structure are located in the region from the front side F offset to the rear side R of the fold less than or equal to 2.5 mm. It may be chosen that the axes of the pins of the second rotating connection structure are located in the region from the front side F offset to the rear side R of the fold less than or equal to 2 mm, 1.5 mm, or 1 mm.

Figure 14:
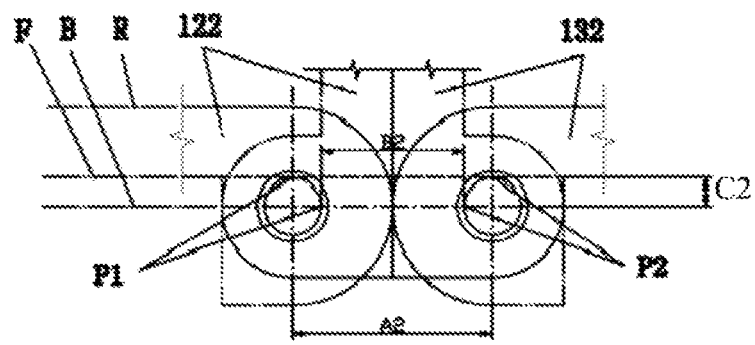
FIG. 14 is a schematic diagram showing that the rotation axis of the second rotating connection structure is located on the plane B which offsets forward away from the front side of the folded support, the distance between adjacent points P1 and P2 on the front side of adjacent folds is decreasing in the folding process (In order to clearly show the expansion and collapse states, the adapting piece is not shown).

In other embodiments as shown in FIG. 14, the rotational axis of the hinge is located on the plane B which is forward offset from the front side F of the fold. When the rotational axis of the hinge is located on the plane B and the folded support 100 is in the final expanded state, the distance between the adjacent points P1 and P2 of the two adjacent folds is A2, it is the maximum distance in the rotation process rotating to the final folded state (as shown in FIG. 14, A2 is greater than B2). Therefore, when the rotational axis of the hinge is located on the plane B which is offset forward from the folding side F, the folding of the folded support 100 does not lead the flexible film, which is attached to the folded support, to be deformed.

Therefore, the purpose of the present invention can be realized when the hinge axis of the second rotating connection structure is located on the plane A, which is offset by 2.5 mm from the front side F of the fold toward the rear side R of the fold and is located in the region of the plane A facing the front side of the fold.

Figure 15:
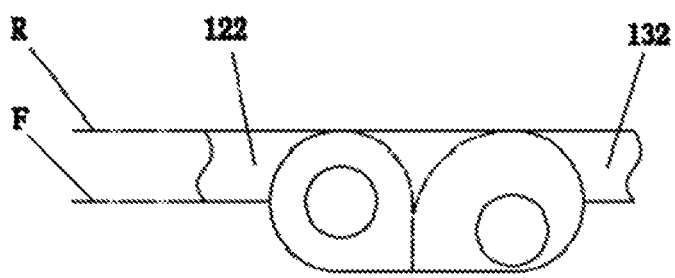
FIG. 15 shows another embodiment of the second rotating connection structure of the folded support of the present invention.

As shown in FIG. 15, the hinge axes of the second rotating connection structure offset different distances from the front side F of the fold. However, the purpose of the present invention can also be realized as long as it is ensured that the two hinge axes are both located on the plane A mentioned above, which is offset from the front side F of the fold toward the rear side R of the fold by 2.5 mm and is located in the region of the plane A facing the front side of the fold.

As shown in FIG. 9, in order to improve the stability of the folds in the folding process, the following structure is used in the second rotating connection structure: on both of the second upper connection structure and the second lower connection structure of the second rotating connection structure, or on one of the second upper connection structure and the second lower connection structure of the second rotating connection structure, a circular arc surface 12*a* (located on the hinged part of the fold 12) and a circular arc surface 13*a* (located on the hinged part of the fold 13) are respectively arranged on the outer side of the hinged parts of the two folds which are hinged with the adapting piece 123. The circular arc surface 12*a* is connected with the rear side of the fold 12 and the limit surface 2A2-125*a* of the second limit structure of the fold 12. The circular arc surface 13*a* is connected with the rear side of the fold 13 and the limit surface 2B2-135*a* of the second limit structure of the fold 13. The circular arc surface 12*a* and the circular arc surface 13*a* get in touch with each other in the final state of expansion of the folded support and in the folding process of the folded support.

In other embodiments, it does not affect the realization of the purpose of the present invention that the second rotating connection structure is not provided with the circular arc surface 12A and the circular arc surface 13A.

Corresponding to the second rotating connection structure, the limit structure adopts the second limit structure. The following structures are used in the second limit structure: as shown in FIGS. 7 and 9, the second limit structure comprises limit surfaces 2A1-125, 2B1-135, and/or 2A2-125*a*, 2B2-135*a*. The limit surfaces 2A1-125 and 2B1-135 are arranged on out surfaces of the hinged parts at the upper ends 122 and 132 of the erect end side of the two adjacent folds, the limit surface 2A1-125 is located on the fold 12 and the limit surface 2B1-135 is located on the other fold 13. The limit surfaces 2A2-125*a* and 2B2-135*a* are arranged on out surfaces of the hinged part at the lower end of the erect end side of the two adjacent folds, the limit surface 2A2-125*a* is located on the fold 12 and the limit surface 2B2-135*a* is located on the other fold 13. The limit surfaces 2A1-125 and 2B1-135 limit match each other when the folded support is in the final state of expansion and separate from each other when the folded support is in the final folded state. The limit surfaces 2A2-125*a* and 2B2-135*a* limit match each other when the folded support is in the final state of expansion and separate from each other when the folded support is in the final folded state.

Figure 11:
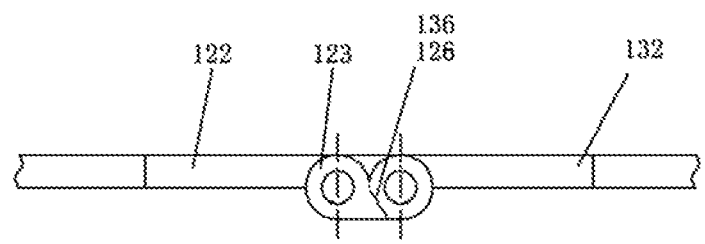
FIG. 11 shows the enlarged view of part IV in FIG. 2 and another embodiment of the folded support of the present invention.

As shown in FIGS. 7 and 9, the limit surfaces of the second limit structure are arranged along the direction of the thickness of the fold. In other embodiment as shown in FIG. 11, the limit purpose of the fold 12 and fold 13 can also be realized when the limit surfaces 2A1-126 and 2B1-136 of the second limit structure are arranged along the inclined direction of the fold thickness.

In the embodiment, a four-fold folded support is shown as an example. In other embodiments, the folded support 100 can be used in two-fold, three-fold, five-fold, six-fold, etc. according to the need. When two-fold are used, the rotating connection structure can be used in the first rotating connection structure or the second rotating connection structure. When the structure is above three folds, the adjacent rotating connection structure of the folded support alternately adopts the first rotating connection structure and the second rotating connection structure.

Figure 21:
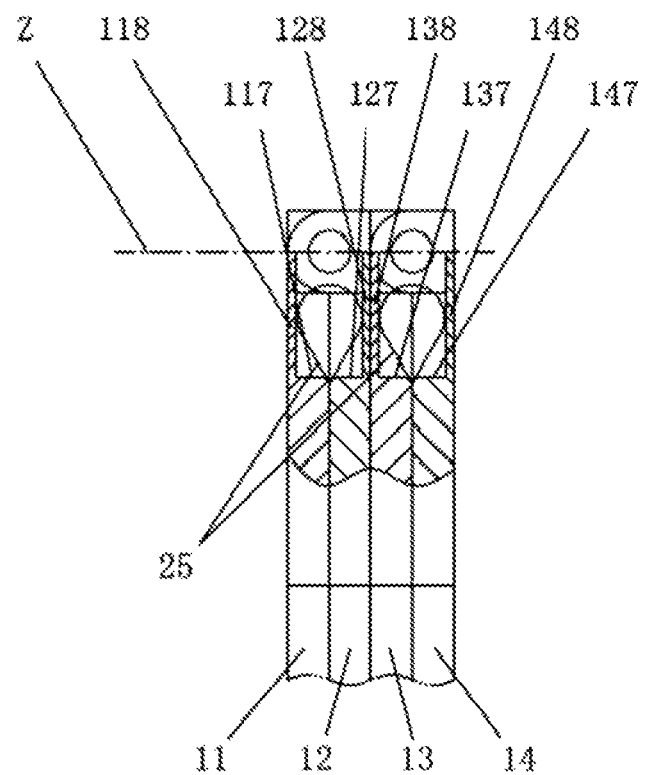
FIG. 21 shows the enlarged part section view of Part V of an embodiment in FIG. 16.

In other embodiments as shown in FIG. 21, to protect the flexible film attached to the folded support in the final expanded state of the folded support, the fold with the first rotating connection structure is provided with a guard edge.

On one erect end of the rear side of the folds which are connected by the first rotating connection structure, guard edges 118, 128, 138, and 148 are provided. The guard edges 118, 128, 138, and 148 are located between the first upper connection structure and the first lower connection structure and are extended from the rear side of the fold. The erect end face of the guard edges 118, 128, 138, and 148 is adjacent to the plane Z which passes though the axis of the first rotating connection structure and is perpendicular to the rear side of the fold, and the guard edges 118, 128, 138, and 148 can extend to the plane Z at most.

When the guard edges 118, 128, 138, and 148 extend to the plane Z, at the final expanded state of folded support, the guard edges 118 and 128, 138 and 148 contact and cooperate with each other to ensure that there is no gap between the folds. The closer the extension of the guard edges 118, 128, 138, and 148 are to the plane Z, the smaller the gaps between the folds are in the final expanded state of the folded support. When the guard edges 118, 128, 138, and 148 extend beyond the plane Z, the folds interfere with each other in the final expanded state of the folded support.

In the final folded state of the folded support, the space between the inner sides 118 and 128 of the adjacent two folds connected by the first rotating connection structure and the erect end sides 117 and 127 of the two fold (between the inner sides 138 and 148 of the adjacent two folds connected by the first rotating connection structure and the erect end sides 137 and 147 of the two fold), is the space to accommodate the circle formed by the minimum bending radius of the flexible membrane 25.

In the embodiment as shown in FIG. 1, to make the lower end of the first upper connection structure and the second upper connection structure on the folds 11, 12, 13 and 14 of the folded support 100 to be flush with the upper end face of the fold and to make the upper end of the first lower connection structure and the second lower connection structure to be flush with the lower end face of the fold, it is convenient for the flexible film to be arranged continuously on the folds.

Figure 22:
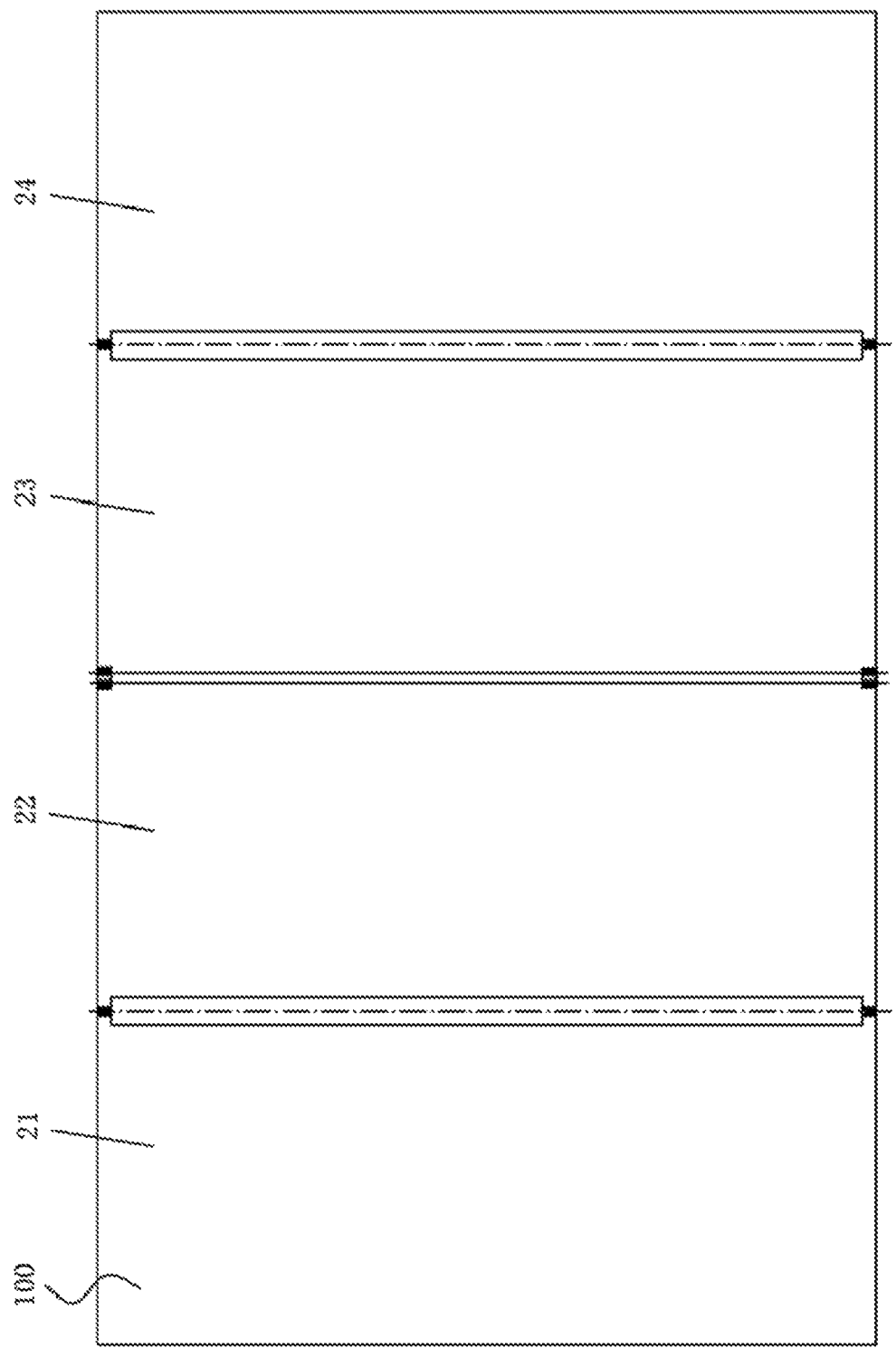
FIG. 22 shows the front view of another embodiment in the final state of expansion of the folded support of the present invention.

In another embodiment as shown in FIG. 22, it can keep the folded support 100 to be a complete rectangle to make the upper and lower end of the folds 21, 22, 23, and 24 of the folded support 100 to be respectively flush with the upper end face of the first upper connection structure and the second upper connection structure and the lower end face of the first lower connection structure and the second lower connection structure.

In other embodiments, according to the need, the purpose of the present invention can be realized by setting the lower end of the first upper connection structure and the second upper connection structure of the folded support 100 to be flush with the upper end face of the fold and setting the lower end of the first lower connection structure and the second lower connection structure of the folded support 100 to be flush with the lower end face of the fold, or setting the upper end of the first upper connection structure and the second upper connection structure of the folded support 100 to be flush with the upper end face of the fold and setting the upper end of the first lower connection structure and the second lower connection structure of the folded support 100 to be flush with the lower end face of the fold.

When the folded support is used in the two-fold structure, the rotating connection structure can be used in the first connection structure or the second connection structure, and the fold and the connection structure can be used in the above structures.

To keep the folded support 100 in the final state of expansion, a first expansion positioning structure and a second expansion positioning structure are provided.

As shown in FIG. 6, the first expansion positioning structure arranged on the first upper connection structure comprises a positioning part 1a and a positioning part 1b. The limit surface 1A-112 of the first limit structure is arranged on the positioning part 1a. The limit surface 1B-122 of the first limit structure is arranged on the positioning part 1b. The positioning part 1a and the positioning part 1b can be magnetically attached to each other and overlap at least part when the folded support 100 is in the final state of expansion.

The first expansion positioning structure can be arranged on the upper connection structure or the lower connection structure as above or can be arranged on the upper connection structure and the lower connection structure as above simultaneously.

As shown in FIG. 7, the second expansion positioning structure arranged on the second upper connection structure comprises a positioning part 2a1 and a positioning part 2b1. The limit surface 2A1-125 of the second limit structure is arranged on the positioning part 2a1. The limit surface 2B1-135 of the second limit structure is arranged on the positioning part 2b1. The positioning part 2a1 and the positioning part 2b1 can be magnetically pulled together and overlap at least part when the folded support 100 is in the final state of expansion.

As shown in FIG. 9, the second expansion positioning structure arranged on the second lower connection structure comprises a positioning part 2a2 and a positioning part 2b2.

The limit surface 2A2-125a of the second limit structure is arranged on the positioning part 2a2. The limit surface 2B2-135a of the second limit structure is arranged on the positioning part 2b2. The positioning part 2a2 and the positioning part 2b2 can be magnetically pulled together and overlap at least part when the folded support 100 is in the final state of expansion.

The second expansion positioning structure can be arranged on the second upper connection structure or the second lower connection structure as above or can be arranged on the second upper connection structure and the second lower connection structure as above simultaneously.

In other embodiments, the basic purpose of the present invention can still be served even if the first expansion positioning structure and the second expansion positioning structure are not provided. In the way, the folded support 100 can be placed on the desk or in the hand in its final expanded state.

To ensure positioning of the folded support 100 after folding, a fold positioning structure is provided. The fold positioning structure comprises a part E and a part F which are magnetically attached to each other. The parts E and F are respectively arranged on two adjacent folds. When the folded support is in the final folded state, the parts E and F overlap are overlap at least partially and attract each other.

In other embodiments, the purpose of the present invention can also be realized without setting the fold positioning structure.

To facilitate the folded support to stand, a support part is provided. The support part is collapsible and connected on the rear side of the fold. The support part is folded onto the rear side of the fold when the folded support 100 is in the final folded state. When the folded support is in the final state of expansion, the support part is expanded and matched with the lower side of the folded support to support the folded support to stand on the desk in an inclined posture.

In other embodiments, the purpose of the present invention can also be realized without providing the support part.

Figure 23:
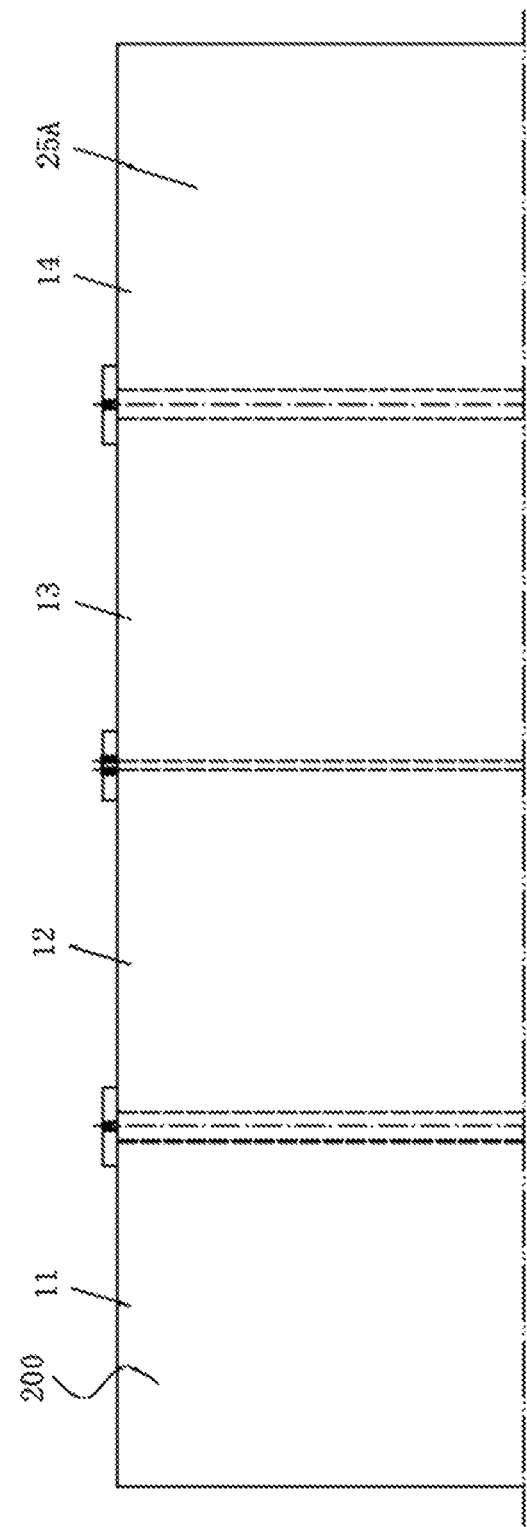
FIG. 23 shows the upper part of the front view using an embodiment of the folded support of FIG. 1 in the final expanded state of the display of the present invention.
Figure 24:
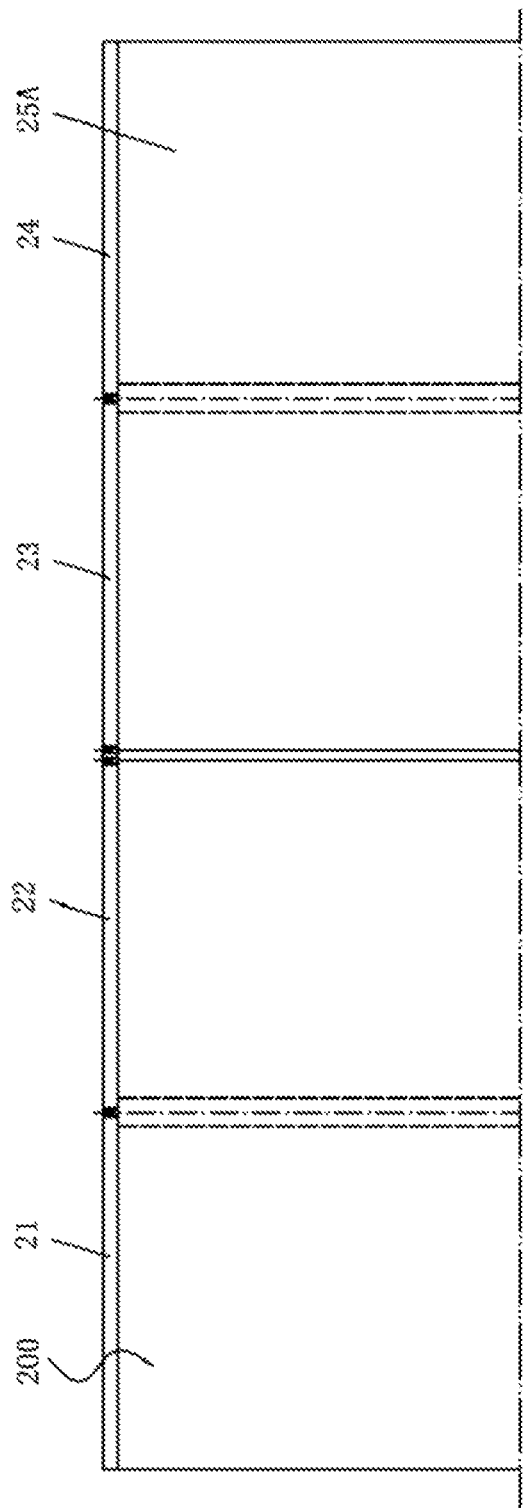
FIG. 24 shows the upper part of the front view using an embodiment of the folded support of FIG. 22 in the final expanded state of the display of the present invention.
Figure 25:
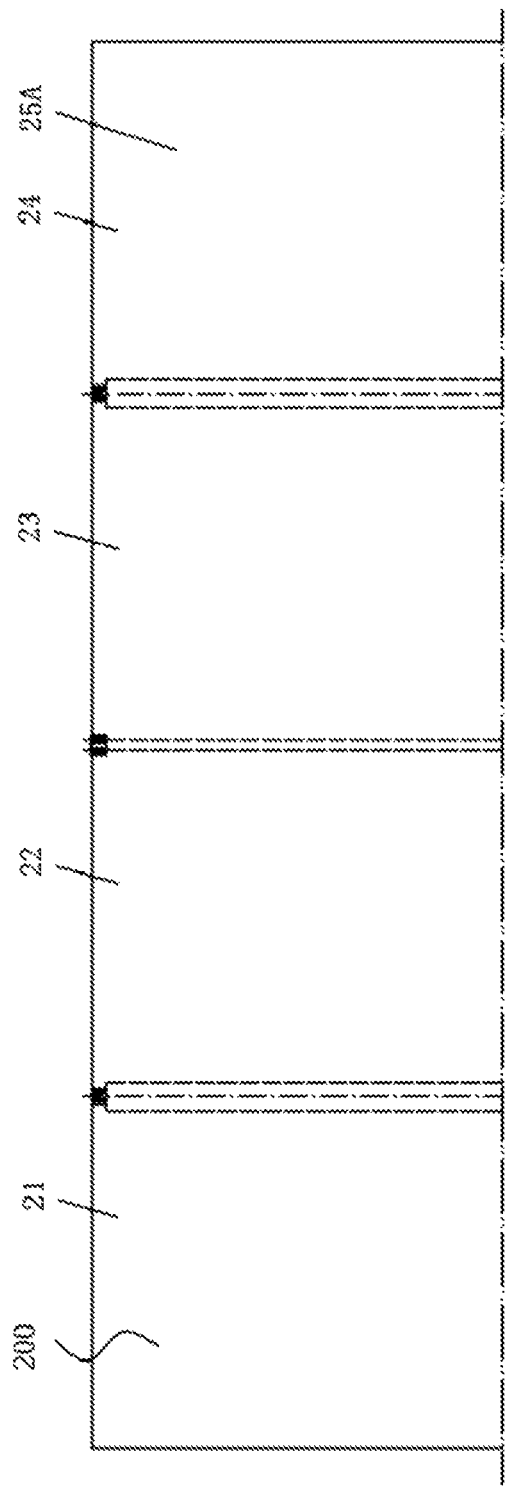
FIG. 25 shows the upper part of the front view using another embodiment of the folded support of FIG. 22 in the final expanded state of the display of the present invention.

As shown from FIGS. 23-25, the display 200 of the present invention comprises a folded support and a flexible display 25A. The flexible display 25A is attached onto the front side of the folded support. The folded support is the folded support of the present invention. The detailed structure of the display 200 is as follows:

A. When the number of folds of the folded support is at least three, in the folded support, the upper end face of the fold is flush with the upper end of the first upper connection structure and the upper end of the second upper connection structure of the fold, the lower end face of the fold is flush with the lower end of the first lower connection structure and the lower end of the second lower connection structure of the fold (the same below). When the number of folds of the folded support is two, in the folded support, the upper end face of the fold is flush with the upper end of the first upper connection structure or the upper end of the second upper connection structure of the fold, the lower end face of the fold is flush with the lower end of the first lower connection structure or the lower end of the second lower connection structure of the fold (the same below). The flexible display is attached to the front side of the folded support and is in a continuous flat state when the folded support is in the final state of expansion.

a) The upper edge of the flexible display 25A is flush with the lower end of the first upper connection structure and/or the lower end of the second upper connection structure (When the number of folds of the folded support is at least three, it is "and"; when the number of folds of the folded support is two, it is "or", the same as below). The upper edge of the flexible display 25A is flush with the upper end of the first lower connection structure and/or the upper end of the second lower connection structure.

b) Or the upper edge of the flexible display 25A is flush with the upper end face of the fold, and the lower edge of the flexible display 25A is flush with the lower end face of the fold. The flexible display 25A is set notches corresponding to the positions of the first upper connection structure, the second upper connection structure, the first lower connection structure and the second lower connection structure to avoid the hinges of the connection structures.

c) Or the upper edge of the flexible display 25A is flush with the lower end of the first upper connection structure and/or the lower end of the second upper connection structure. The lower edge of the flexible display 25A is flush with the lower end of the first lower connection structure and/or the lower end of the second lower connection structure. The flexible display 25A is set notches corresponding to the positions of the first lower connection structure and the second lower connection structure to avoid the hinges of the connection structures.

d) Or the upper edge of the flexible display 25A is flush with the upper end of the first upper connection structure and/or the upper end of the second upper connection structure. The lower edge of the flexible display 25A is flush with the upper end of the first lower connection structure and/or the upper end of the second lower connection structure. The flexible display 25A is set notches corresponding to the positions of the first upper connection structure and the second upper connection structure to avoid the hinges of the connection structures.

B. The upper end face of the fold of the folded support is flush with the lower end of the first upper connection structure and/or the lower end of the second upper connection structure of the fold, the lower end face of the fold is flush with the upper end of the first lower connection structure and/or the upper end of the second lower connection structure of the fold. The flexible display 25A is attached to the front sides of the folds between the upper end and the lower end of each fold of the folded support, and it is in a continuous straight state when the folded support is in the final state of expansion.

C. The upper end face of the fold of the folded support is flush with the upper end of the first upper connection structure and/or the upper end of the second upper connection structure of the fold, the lower end face of the fold is flush with the upper end of the first lower connection structure and/or the upper end of the second lower connection structure of the fold. The flexible display 25A is attached to the front side of the folded support and it is in a continuous straight state when the folded support is in the final state of expansion.

a) The upper edge of the flexible display 25A is flush with the upper end of the first upper connection structure and/or the upper end of the second upper connection structure. The lower edge of the flexible display 25A is flush with the upper end of the first lower connection structure and/or the upper end of the second lower connection structure. The flexible display 25A is set notches corresponding to the positions of the first upper connection structure and the second upper connection structure to avoid the hinges of the connection structures.

b) Or the upper edge of the flexible display 25A is flush with the lower end of the first upper connection structure and/or the lower end of the second upper connection structure. The lower edge of the flexible display 25A is flush with the upper end of the first lower connection structure and/or the upper end of the second lower connection structure.

D. The upper end face of the fold of the folded support is flush with the lower end of the first upper connection structure and/or the lower end of the second upper connection structure of the fold, the lower end face of the fold is flush with the lower end of the first lower connection structure and/or the lower end of the second lower connection structure of the fold. The flexible display 25A is attached to the front side of the folded support and it is in a continuous straight state when the folded support is in the final state of expansion.

a) The upper edge of the flexible display 25A is flush with the lower end of the first upper connection structure and/or the lower end of the second upper connection structure, the lower edge of the flexible display 25A is flush with the upper end of the first lower connection structure and/or the upper end of the second lower connection structure of the fold.

b) Or the upper edge of the flexible display 25A is flush with the lower end of the first upper connection structure and/or the lower end of the second upper connection structure of the fold, the lower edge of the flexible display 25A is flush with the lower end of the first lower connection structure and/or the lower end of the second lower connection structure of the fold. The flexible display 25A is set notches corresponding to the positions of the first lower connection structure and the second lower connection structure to avoid the hinges of the connection structures.

In other embodiments, to facilitate the use of the display 200 in the folded state, the flexible display 25A is also attached to the rear side of one of the end folds of the folded support in addition to using the structure of the display 200 as above. Thus, in the folded state of the display, the flexible display 25A is visible for information display. That is, the display can be used without expanding the display in the folded state.

The keyboard of the present invention comprises a folded support, a flexible sensing film, and a mapping keyboard. The folded support is the folded support as mentioned above, the flexible sensing film is attached onto the front side of the folded support and the mapping keyboard is arranged onto the flexible sensing film. The mapping keyboard refers to a keyboard formed by setting key areas on the flexible sensing film corresponding to the real keyboard, making each key area to correspond to a key of the real keyboard, giving the corresponding key input function to the key area and realizing the complete input function of the real keyboard by each key area.

The electrical appliance of the present invention comprises a circuit module for realizing the function of an electrical appliance, a power supply module for supplying the electrical appliance and a display module for displaying the processing information of the circuit module. The power supply module is electrically connected with the circuit module and the display module, and the display module is electrically connected with the circuit module to output the processing information of the circuit module.

The display is the display 200 of the present invention as mentioned above.

Figure 26:
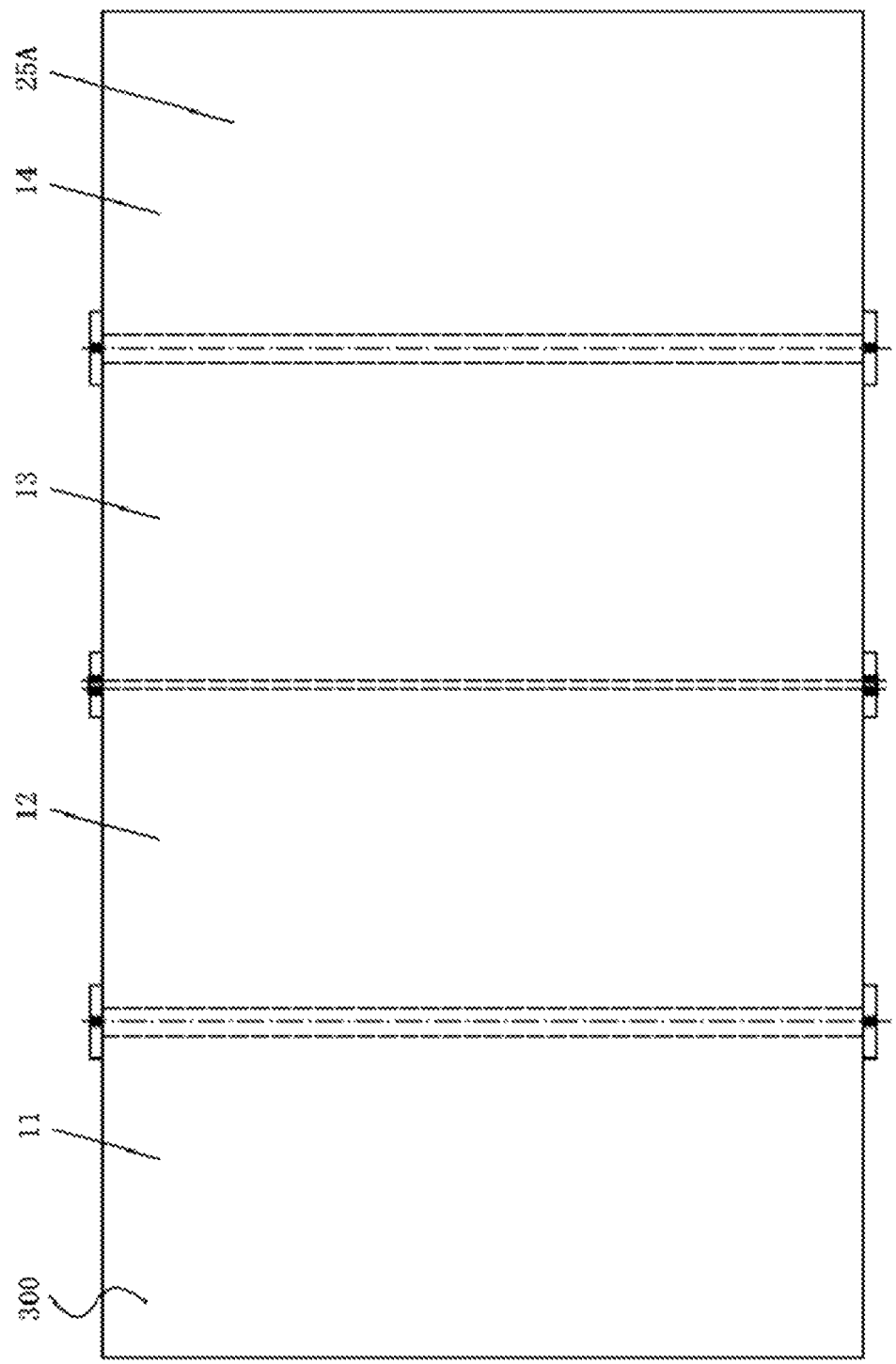
FIG. 26 shows the front view of the final expanded state of the display using the folded support of FIG. 1.
Figure 27:
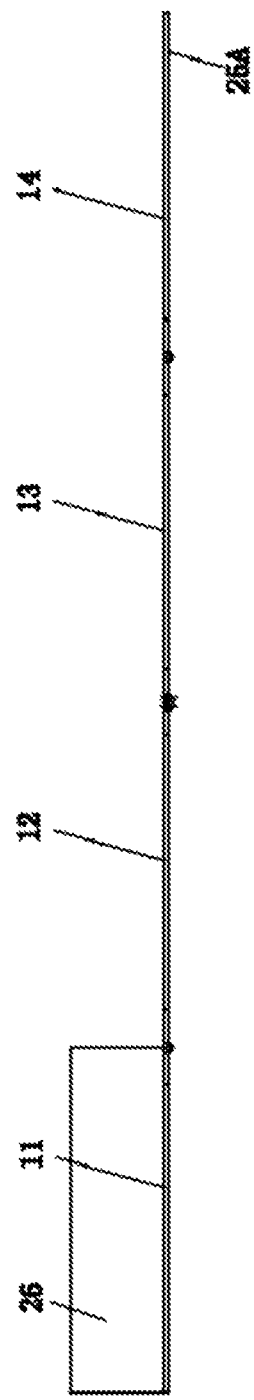
FIG. 27 shows the top view of an embodiment in the final expanded state of the present invention of FIG. 26.

As shown in FIGS. 26 and 27, in one embodiment, the circuit module 26 of the electrical appliance 300 of the present invention is fixedly arranged on the rear side of the fold 11 of the folded support, and the power supply module is integrated in the circuit module 26.

As shown in FIGS. 28-30, it is the state of the electrical appliance 300 after folding and the relationship of the display 25A and the first and second rotating connection structures of the folded support 100 after folding.

In other embodiment, the power supply module is fixedly or rotatably connected to the rear side of the folded support 100, and the circuit module is fixedly connected to the rear side of one of the folds of the folded support 100 or the rear side of the combination of the folds. The power supply module and the circuit module can be integrated together or set separately.

In other embodiment, the power supply module is fixed or rotatably connected to the rear side of the folded support 100, and the circuit module is rotatably connected to the end fold of the folded support 100. In the folding state, the circuit module is folded to the rear side of the end fold. The power supply module and the circuit module can be integrated together or set separately.

In another embodiment, the power supply module is fixed or rotatably connected to the rear side of the folded support 100, and the circuit module is rotatably connected to the upper side or the lower side of the middle fold of the fold support 100. In the folding state, the circuit module is folded to the rear side of the middle fold. The power supply module and the circuit module can be integrated together or set separately.

Figure 31:
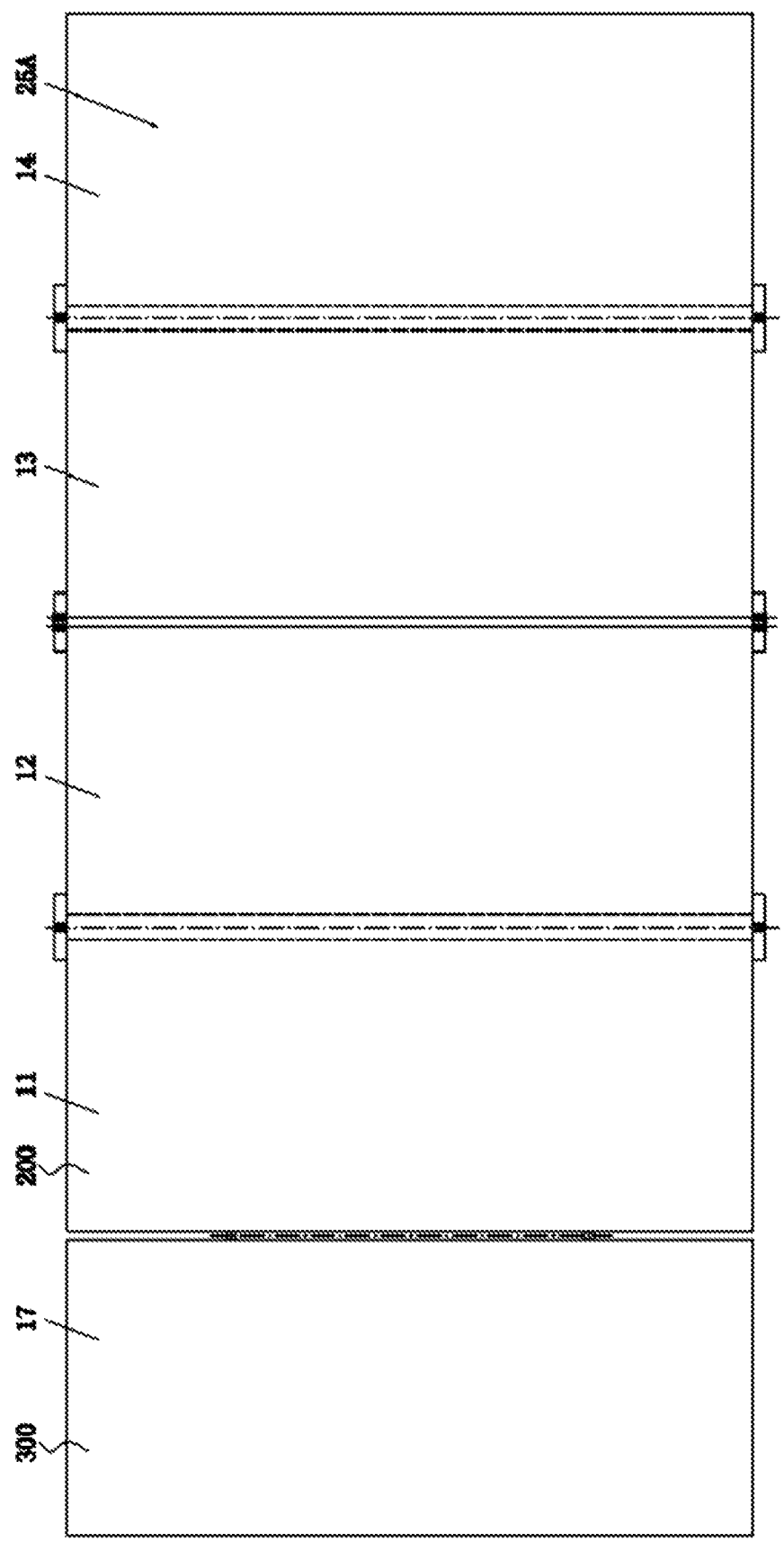
FIG. 31 shows the front view of the expanded final state of the electrical appliance of the present invention using the other embodiment of the folded support of FIG. 1.
Figure 32:
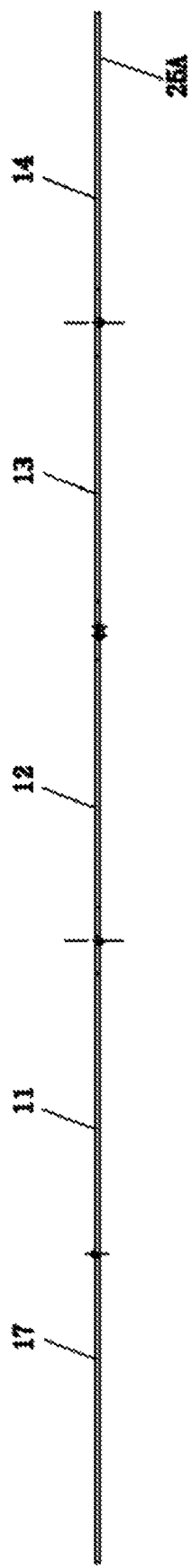
FIG. 32 shows the top view of the embodiments of FIG. 31 in the final expanded state of the electrical appliance of the present invention.

As shown in FIGS. 31 and 32, in another embodiment of the electrical appliance of the present invention, by using integrated circuits to miniaturize the circuit module, using solar cells to collect solar energy, and using graphene cells and other technologies to store electricity, the circuit module and the power supply module can be integrated together and ultra-thin processed into a chip power supply and the circuit module 17, the power supply and the circuit module 17 are rotatably connected to the end fold 11 of the folded support of the display 200 and electrically connected with the display, so as to realize the large screen electrical appliances without charging.

The electrical appliances of the present invention include but are not limited to smart phones, tablet computers, notebook computers, MP4 players, etc.

When providing a notebook computer or other electrical appliances requiring a keyboard, the keyboard of the present invention can be adopted, and the flexible sensing film of the keyboard is electrically connected with the circuit module.

The electrical connection between the keyboard and the circuit module may adopt the following structures, comprising but not limited to:

1. To connect an end fold of the keyboard folded support with the corresponding end fold of the display folded support of the electrical appliance and connect the flexible sensing film of the keyboard with the circuit module of the electrical appliance. When folding, fold the display, the circuit module and the power supply module respectively, and then fold the folded keyboard with the folded display, circuit module and power supply module.

2. To set a connection port A on the circuit module of the electrical appliance, to set a connection port B on the keyboard to connect the flexible sensing film of the keyboard. The connection port A is compatible with the connection port B to realize the detachable connection. A snap connection with a magnetic element may be adopted, or a plug-in connection may be adopted.

What is claimed is:
1. A foldable support for a flexible structure, comprising a plurality of folds comprising a first fold and a second fold that is adjacent to the first fold, wherein the first fold and the second fold are connected side by side by a rear rotating connection structure and foldable from an expanded state to a folded state,
the rear rotating connection structure rotatably connecting the first fold to the second fold at upper ends and lower ends of the first fold and the second fold near side surfaces of the first fold and the second fold facing each other, respectively, wherein the side surfaces of the first fold and the second fold facing each other define a gap between the first fold and the second fold in the expanded state of the foldable support, and the rear rotating connection structure is configured to cause the first fold and the second fold to rotate rearwards so rear surfaces of the first fold and the second fold become closer to each other from the expanded state to the folded state,
wherein front surfaces of the plurality of the folds are configured to support a flexible structure,
the rear rotating connection structure comprises an upper rear connection structure rotatably connecting the upper ends near of the side surfaces of the first fold and the second fold, and a lower rear connection structure rotatably connecting the lower ends near the side surfaces of the first fold and the second fold,
the upper rear connection structure comprising an upper adapting piece, a first upper hinge structure, and a second upper hinge structure, the first upper hinge structure rotating around a first hinge axis and connecting the upper end of the first fold and a first end of the upper adapting piece through a first upper pin shaft, the second upper hinge structure rotating around a second hinge axis and connecting the upper end of the second fold and a second end of the upper adapting piece through a second upper pin shaft,
the lower rear connection structure comprises a lower adapting piece, a first lower hinge structure, and a second lower hinge structure, the first lower hinge structure rotating around the first hinge axis and connecting the lower end of the first fold and a first end of the lower adapting piece through a first lower pin shaft, the second lower hinge structure rotating around the second hinge axis and connecting the lower end of the second fold and a second end of the lower adapting piece through a second lower pin shaft,
distance between the first and the second hinge axes is equal to or greater than a sum of a distance from the first hinge axis to the rear surface of the first fold and a distance from the second hinge axis to the rear surface of the second fold, and
the rear surfaces of the first fold and the second fold are close to each other, and the flexible structure is flatly attached to the front surfaces of the first fold and the second fold and matches up or keeps a gap with the side surfaces of the first fold and the second fold in the folded state.

2. The foldable support of claim 1, further comprising
at least a third fold adjacent to and being connected side by side to the first or second fold through a front rotating connection structure,
a limit structure for aligning front surfaces of the folds of the foldable support in a same plane in the expanded state, and
the front rotating connection structure rotatably connecting the third fold to the first or second fold and causing the front surfaces of the third fold and the first or second fold to move forward to be close to each other in the folded state, wherein the front rotating connection structure comprises an upper front connection structure at upper ends near the side surfaces of the third fold and the first or second fold, and a lower front connection structure at lower ends near of the side surfaces of the third fold and the first or second fold, and the upper and lower front connection structures are hinge structures that rotate around a front rotation axis, the upper front connection structure comprises a first upper hinged arm of the upper end of the third fold and a second upper hinged arm of the upper end of the first or second fold, and the lower front connection structure comprises a first lower hinged arm of the lower end of the third fold and a second lower hinged arm of the lower end of the first or second fold, the front rotation axis is either co-planar with the front surfaces of the third fold and the first or second fold or within a distance of equal to or less than 2.5 mm in front of and away from the front surfaces of the third fold and the first or second fold in the expanded state, and the plurality of folds of the foldable support are connected side by side by the rear rotating connection structure and the front rotating connection structure alternately.

3. The foldable support of claim 2, wherein the limit structure comprises a front limit structure being arranged on the upper front connection structure, the lower front connection structure, or both, and is configured to align the front surfaces of the third fold and the first or second fold in a same plane in the expanded state, and in the folded state, a distance from a separation point to the front rotation axis is equal to or longer than a minimum bending radius of the flexible structure attached to the front surfaces of the third fold and the first or second fold multiplied by π, the separation point is a point where the flexible structure separates from an edge of the front surfaces of the third fold and the first or second fold.

4. The foldable support of claim 3, wherein the upper front connection structure comprises hinge holes on the first and the second upper hinged arms respectively, and an upper pin shaft is in coordination and hinged with the upper hinge holes, the lower front connection structure comprises hinge holes on the first and the second lower hinged arms respectively, and a lower pin shaft is in coordination and hinged with the lower hinge holes, the front limit structure comprises a first front limit surface and a second front limit surface being respectively arranged on outer sides of the first and the second upper hinged arms, or outer sides of the first and the second lower hinged arms, or the front limit structure comprises two pairs of the first front limit surface and the second front limit surface being respectively arranged on the outer sides of both the first and second upper hinged arms and the first and second lower hinged arms, and the first and second front limit surfaces coordinate to limit each other in the expanded state and separate with each other in the folded state.

5. The foldable support according to claim 2, wherein the limit structure comprises a rear limit structure corresponding to the rear rotation connection structure, wherein the rear limit structure comprises at least one pair of a first rear limit surface and a second rear limit surface;

the first rear limit surface is located on outside of the upper end, the lower end or both of the first fold;

the second rear limit surface is located on outside of the upper end, lower end or both of the second fold correspondingly; and the pair of the first and second rear limit surfaces coordinate with each other in the expanded state and separate with each other in the folded state.

6. The foldable support of claim 5, wherein the rear rotating connection structure further comprises a first circular arc surface and a second circular arc surface, the first circular arc surface is arranged on outer side of the upper end, lower end or both of the first fold and connected with the rear surface of the first fold and the first limit surface of the rear limit structure, and the second circular arc surface is arranged on outer side of the upper end, lower end or both of the first fold and connected with the rear surface of the second fold and the second limit surface of the rear limit structure, and the first and second circular arc surfaces contact and cooperate with each other in folding process.

7. The foldable support of claim 2, wherein the front rotating connection structure further comprises guard edges arranged on the rear surface of the third fold and the first or second fold between the front upper and lower connection structures and extend out from the rear surface of the third fold and the first or second fold, end surfaces of the guard edges are close to a plane that contains the front rotation axis of the front rotating connection structure and is perpendicular to the rear surface of the third fold, and the guard edges are bounded by the plane; and in the folded state, a space between inner sides of the guard edges and the side surfaces of the third fold and the first or second fold contains a circle with a minimum bending radius of the flexible structure attached to the front surfaces of the third fold and the first or second fold.

8. The foldable support of claim 1, further comprising a folded positioning structure, wherein the folded positioning structure comprises a pair of magnetic components respectively arranged on the first and the second folds or on the third and the first or second folds, and the magnetic components at least partially overlap and attract each other in the folded state.

9. The foldable support of claim 1, further comprising a support part, wherein the support part is foldable and connected on the rear surface of the fold at an end of the foldable support, and is folded onto the rear surface of the fold to which it is attached in the folded state and expanded and cooperate with lower side of the foldable support to support the foldable support to be in an inclined posture in the expanded state.

10. The foldable support of claim 2, wherein top surfaces of the plurality of the folds are flush with a top surface of the upper front connection structure, a top surface of the upper rear connection structure, or both, and bottom surfaces of the plurality of the folds are flush with a bottom surface of the lower front connection structure, a bottom surface of the lower rear connection structure, or both.

11. The foldable support of claim 2, wherein top surfaces of the plurality of the folds are flush with a top surface of the upper front connection structure, a top surface of the upper rear connection structure, or both, and
bottom surfaces of the plurality of the folds are flush with a top surface of the lower front connection structure, a top surface of the lower rear connection structure, or both.

12. The foldable support of claim 2, wherein top surfaces of the plurality of the folds are flush with a bottom surface of the upper front connection structure, a bottom surface of the upper rear connection structure, or both, and
bottom surfaces of the plurality of the folds are flush with a bottom surface of the lower front connection structure, a bottom surface of the lower rear connection structure, or both.

13. The foldable support of claim 2, wherein top surfaces of the plurality of the folds are flush with a bottom surface of the upper front connection structure, a bottom surface of the upper rear connection structure, or both, and
bottom surfaces of the plurality of the folds are flush with a top surface of the lower front connection structure, a top surface of the lower rear connection structure, or both.

14. The foldable support according to claim 2, wherein the limit structure further comprises a limit part arranged on the rear surface of the third fold between the upper front connection structure and the lower front connection structure, and the limit part coordinates with the rear surface of the first or second fold in the expanded state.

15. The foldable support according to claim 1,
wherein the first and the second hinge axes are located on or before the front surfaces of the first fold and the second fold,
or wherein the first and the second hinge axes are located between the front and rear surfaces of the first fold and the second fold and is offset by a distance of 2.5 mm or less from the front surface towards the rear surface of the first fold and the second fold.

16. The foldable support of claim 4, further comprising a first expanded positioning structure, and
a second expanded positioning structure,
wherein the first expanded positioning structure comprises a first positioning component for setting the first front limit surface of the front limit structure, and a second positioning component for setting the second front limit surface of the front limit structure, and
the first positioning component and the second positioning component are magnetically attracted to each other and at least partially overlapped to attract in the expanded state;
the second expanded positioning structure comprises at least one pair of a first positioning component and a second positioning component corresponding to the at least one pair of the first rear limit surface and the second rear limit surface of the rear limit structure,
the first positioning component of the second expanded positioning structure is for setting the first rear limit surface of the rear limit structure, and the second positioning component of the second expanded positioning structure is for setting the second rear limit surface of the rear limit structure, and
the first positioning component and the second positioning component of the second expanded positioning structure are magnetically attracted to each other and at least partially overlapped to attract in the expanded state.

17. A display according to claim 1, comprising
the foldable support as described in claim 1, and
a flexible display,
wherein the flexible display is the flexible structure that is attached to the front surfaces of the plurality of the folds of the foldable support, or to both the front surfaces of the plurality of the folds of the foldable support and the rear surface of a fold at an end of the foldable support.

18. A keyboard according to claim 1, comprising
the foldable support as described in claim 1,
a flexible sensing film, and
a mapping keyboard,
wherein the flexible sensing film is the flexible structure that is attached to the front surfaces of the plurality of the folds of the foldable support, and the mapping keyboard is arranged on the flexible sensing film.

19. An electrical appliance according to claim 1, comprising
a circuit module configured to perform function of the electrical appliance,
a power supply module, and
a display module to display processing information,
wherein the power supply module is electrically connected with the circuit module and the display module for power supply, the display module is connected with the circuit module to output the processing information of the circuit module;
the display module is a display that comprises the foldable support of claim 1 and a flexible display, wherein the flexible display is the flexible structure that is attached to the front surfaces of the plurality of the folds of the foldable support or to both the front surfaces of the plurality of the folds of the foldable support and the rear surface of an end fold of the foldable support;
the power supply module is fixed or rotatably connected to a rear side of one of the plurality of the folds in the foldable support of claim 1;
the circuit module is fixed on a rear side of one of the fold in the plurality of the folds or a combination of the folds in the plurality of the folds of the foldable support; or the circuit module is rotatably connected with an end fold at one end of the foldable support, in the folded state, the circuit module is folded to the rear surface of the end fold; or the circuit module is rotatably connected with the top or bottom surface of a middle fold in middle of the plurality of the folds of the foldable support, in the folded state, the circuit module is folded to the rear surface of the middle fold;
or both the circuit module and the power supply module are integrated together and are fixedly connected or rotatably connected to a rear side of one of the plurality of the folds in the foldable support.

20. The electrical appliance according to claim 19, further comprising
a keyboard,
wherein the
keyboard comprises the foldable support as described in claim 1, a flexible sensing film, and a mapping keyboard, the flexible sensing film is attached to the front surfaces of the plurality of the folds of the foldable support and is electrically connected with the circuit module, and the mapping keyboard is arranged on the flexible sensing film.

* * * * *